INVENTOR.
WILLIAM T. LIVERMORE
BY J. Joseph Farley
ATTORNEY.

Dec. 28, 1937.   W. T. LIVERMORE   2,103,540
CHANGE SPEED TRANSMISSION
Filed March 12, 1934   9 Sheets-Sheet 2

INVENTOR.
WILLIAM T. LIVERMORE
BY
Joseph Farley
ATTORNEY.

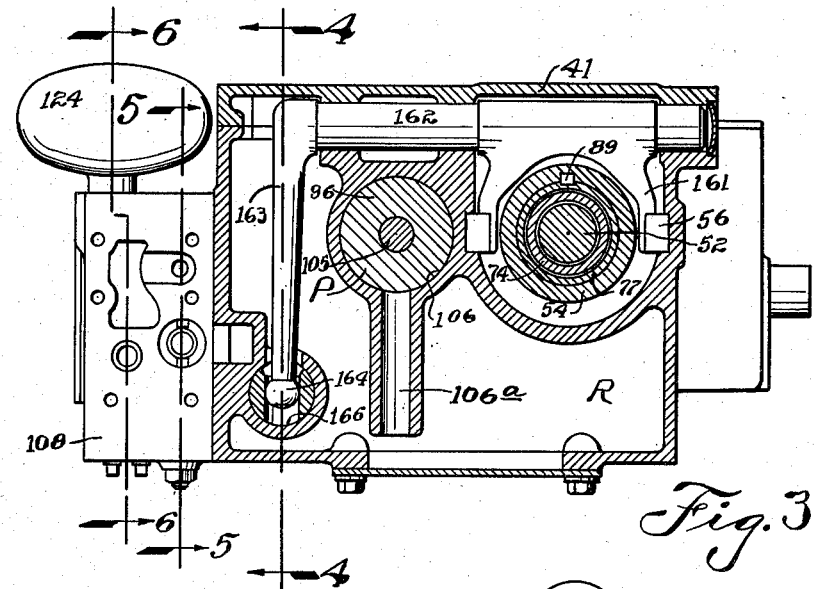

Dec. 28, 1937.  W. T. LIVERMORE  2,103,540
CHANGE SPEED TRANSMISSION
Filed March 12, 1934   9 Sheets-Sheet 4

INVENTOR.
WILLIAM T. LIVERMORE
BY Joseph Farley
ATTORNEY.

Dec. 28, 1937.   W. T. LIVERMORE   2,103,540
CHANGE SPEED TRANSMISSION
Filed March 12, 1934    9 Sheets-Sheet 5

INVENTOR.
WILLIAM T. LIVERMORE
BY Joseph Farley
ATTORNEY.

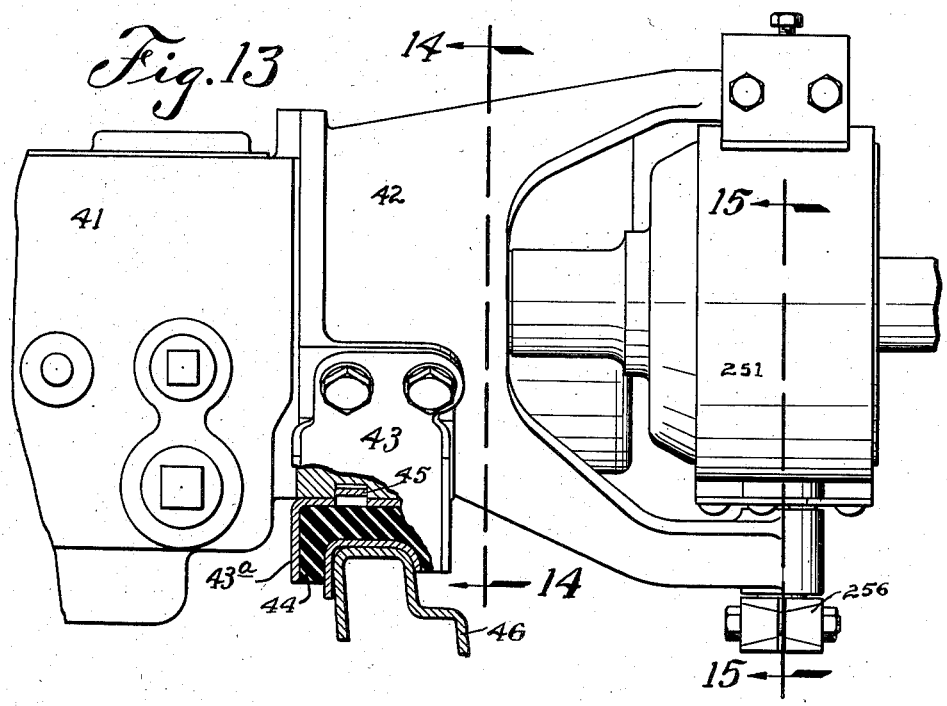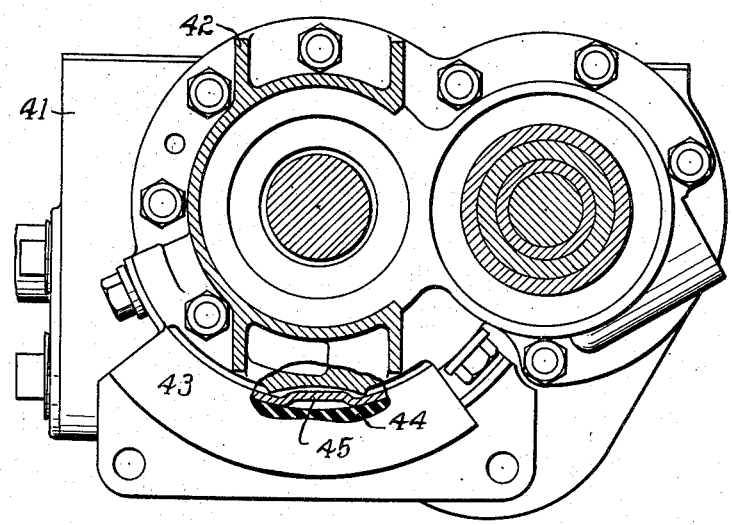

Dec. 28, 1937.　　　W. T. LIVERMORE　　　2,103,540
CHANGE SPEED TRANSMISSION
Filed March 12, 1934　　　9 Sheets-Sheet 7

INVENTOR.
WILLIAM T. LIVERMORE
BY Joseph Farley
ATTORNEY.

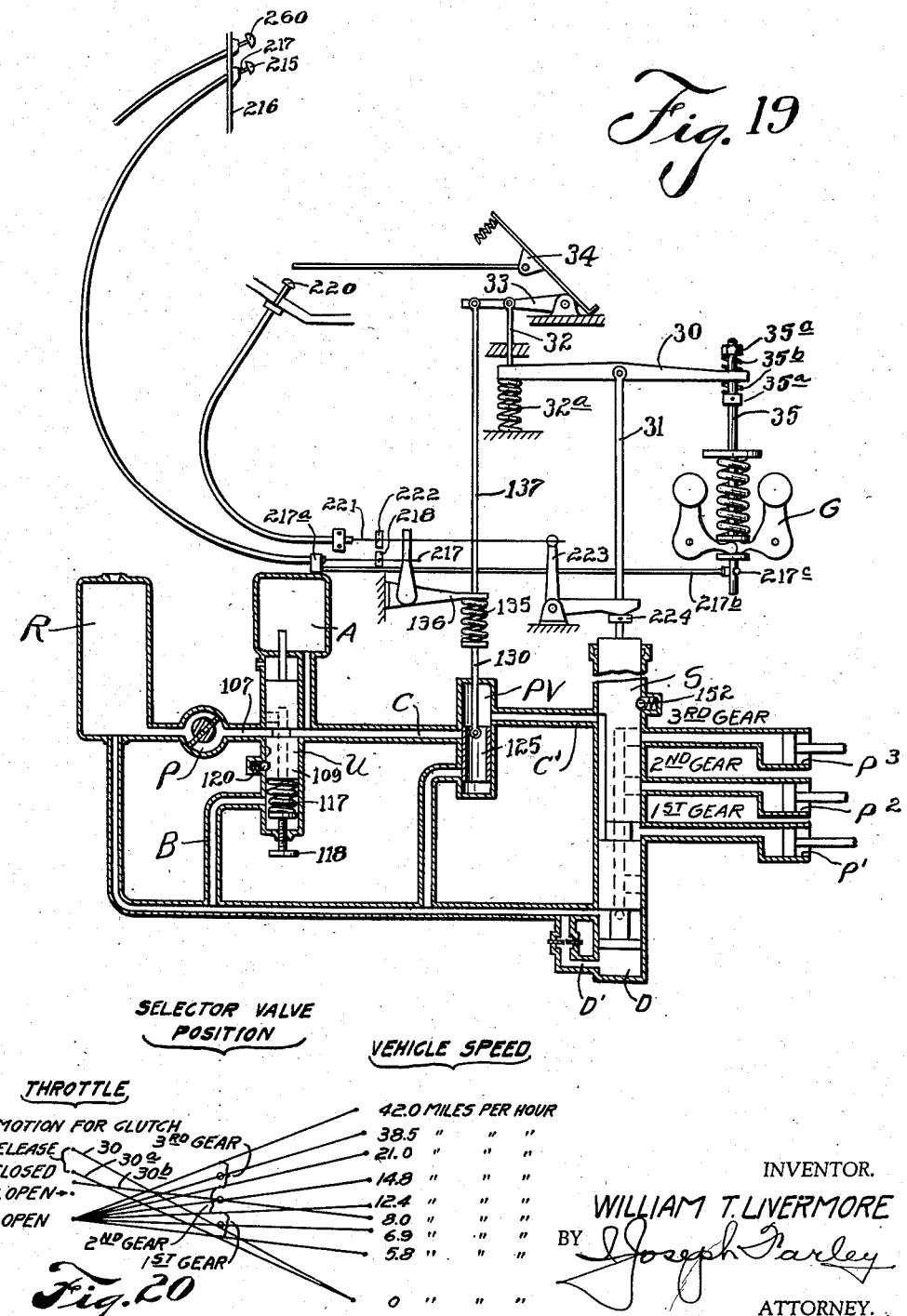

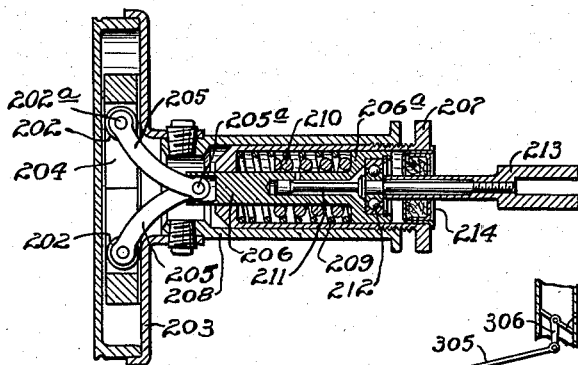
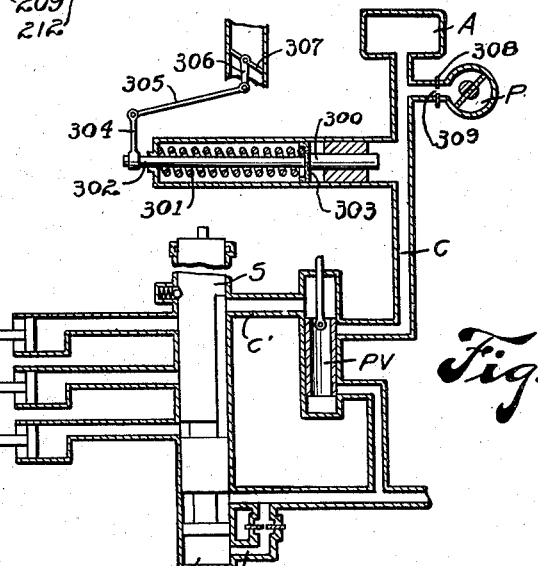
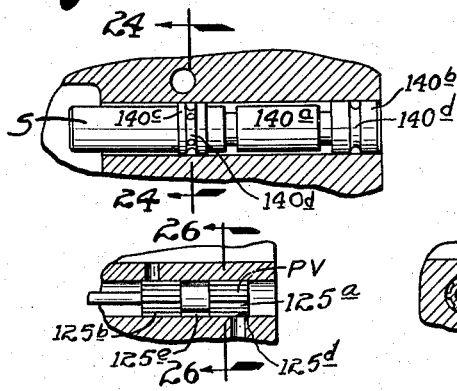
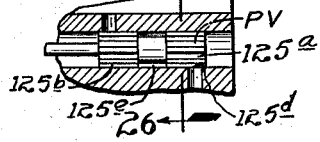

Patented Dec. 28, 1937

2,103,540

UNITED STATES PATENT OFFICE 2,103,540

CHANGE SPEED TRANSMISSION

William T. Livermore, Westfield, N. J.

Application March 12, 1934, Serial No. 715,065

27 Claims. (Cl. 74—472)

This invention relates to automatic speed change transmissions for automobiles and has for its principal object to provide a new and improved, highly efficient, automatic transmission of marked simplicity having a minimum number of parts, so designed and constructed as to be particularly well adapted for manufacture at a relatively low cost by the high speed production methods used in the automotive industry. The present invention represents an improvement upon the transmissions and control systems disposed in my co-pending applications for United States Letters Patent, Serial Nos. 401,532, 584,812 and 603,823.

In its broadest aspects the present invention depends upon the automatic selection of the particular driving ratio between the engine and propeller shaft by the combination of the extent of the throttle opening and the speed of the vehicle, the driving ratio at any instant being effected through a selective transmission somewhat similar to the transmissions in common use in the automotive industry and being made operative by a fluid pressure controlled clutch. There is however, this fundamental difference between the transmission gearing of the present invention and that of the conventional selective sliding gear transmission, in that in the present invention all of those gears which effect forward drive of the vehicle are constantly in mesh and the particular gears which effect the different gear ratios are made operative or inoperative by the use of a fluid pressure operated clutch, as above referred to, there being one of such clutches for each gear ratio.

One of the principal objects of the present invention is to construct an automatic transmission of the type set forth with the transmission gearing, the fluid pressure controlled clutches, the pump for generating the fluid pressure for operating the clutches, and the valves and other control devices of the fluid pressure system, all arranged in a compact unit of relatively small dimensions so that it can be readily installed upon existing standard types of automobiles.

Another object is to provide an automatic transmission for automotive vehicles that will operate smoothly and quietly, and without effort, or without the necessity of skillful manipulation on the part of the driver, will automatically place into operative condition the proper gear ratio for driving conditions when the speed of the vehicle is either accelerating or decelerating and in which, moreover, provision is made instantly to interrupt the automatic operation whenever desirable by very simple manual controls readily accessible to the driver.

A further object is to provide damping means between the engine shaft and driving shaft of the transmission that will effectively absorb any sudden jerks or shocks being transmitted from the engine to transmission or vice versa.

Another object is to provide a change speed transmission especially adapted for automotive vehicles in which the gears for the different forward speed gear ratios are continually in mesh and the highly objectionable features resulting from the necessity of shifting gears into and out of mesh are obviated.

A further object is to construct a transmission of the type disclosed in which a single countershaft carries the clutch and gears for first or low speed drive and also the gears for second speed drive and in which part of the gears employed for second speed are also used for first speed transmission of the drive from the countershaft to the driving shaft.

Another object is to employ the transmission countershaft for driving a fluid pressure pump which supplies fluid under pressure for operating the piston and cylinders which actuate the clutches for the different gear ratios, and to use said countershaft and pump as the fluid pressure piston for the low gear clutch.

A further object is to house the clutches for the second and third gear drives in a single clutch housing and to provide means whereby either of said clutches may be placed into or out of driving relationship by movement of said clutch housing.

Another object is to so construct the transmission and arrange the bearing members of the main driving shaft that the latter will be amply supported and braced against distortion by a plurality of bearing members which form in effect a conical bracing system.

A further object is to provide the main driving shaft with means to prevent the transmission of end thrust due to the operation of the second and high gear clutches carried thereby, from said shaft to the engine or propeller shafts.

Another object is to provide a speed governor of simple, compact and effective design particularly well adapted for use with a transmission of the type set forth.

A further object is to employ certain members of the transmission gears for the different speed ratios to drive the fluid pressure pump whenever the engine is rotating and other members thereof to drive the speed governor at a rate proportional to the speed of the vehicle.

Another object is to provide the fluid pressure system with an automatically operating valve of simple construction for efficiently maintaining the fluid pressure in said system between predetermined maximum and minimum values.

A further object is to provide an automatic transmission in which free wheeling will be automatically established when the throttle accelerator pedal is released, and in which free wheeling can be locked out whenever desired, and also to release the clutches to provide a free wheeling condition automatically at low speeds thereby to prevent stalling of the engine when bringing the car to a stop.

The above and many other objects, such as simplicity of construction, low manufacturing costs, compact, sturdy design of the device as a whole, as well as of its component parts, will appear more fully to those skilled in the art to which the invention appertains from the following more detailed description and by reference to the accompanying drawings forming a part hereof wherein a satisfactory constructional example is shown as illustrating the principles of the invention.

In order that the invention may be more readily understood the general scheme of construction and the nature of the principal component parts will be briefly outlined before proceeding with the detailed description.

In the drawings Fig. 1 is a central horizontal section through a transmission constructed in accordance with the present invention.

Figs. 2 and 3 are sections on the lines 2—2 and 3—3 of Fig. 1 respectively.

Figs. 4, 5 and 6 are sections on the lines 4—4, 5—5 and 6—6 of Fig. 3.

Figure 1:
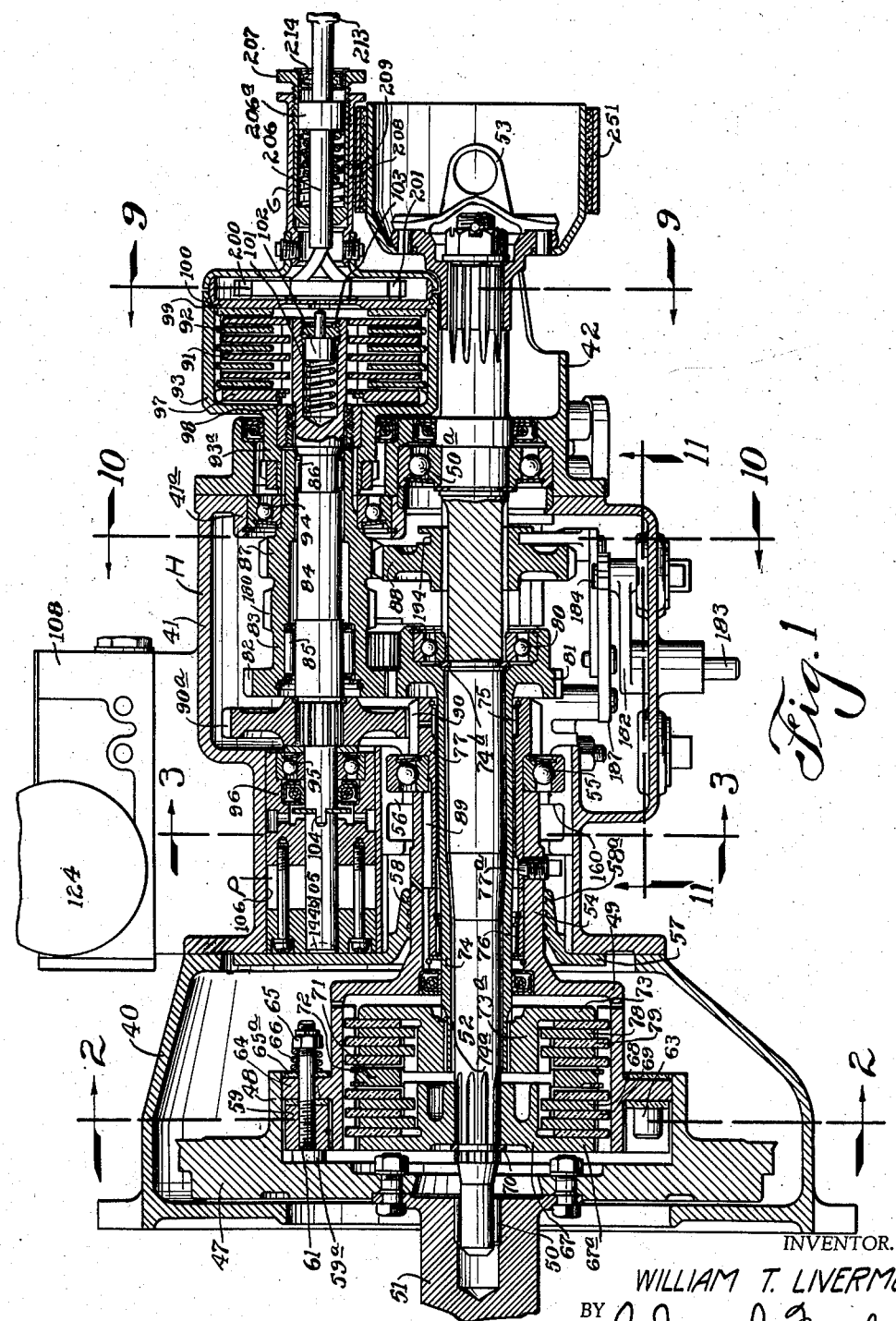
Figure 2:
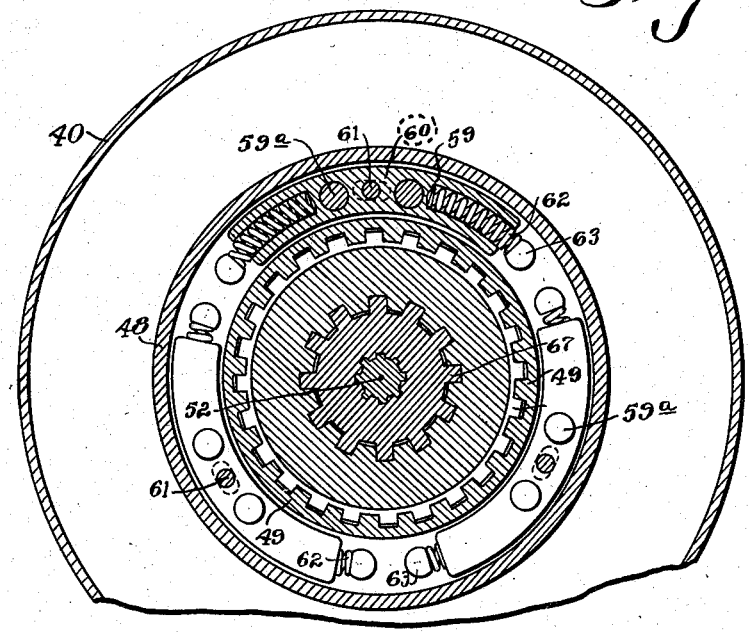
Figure 6:
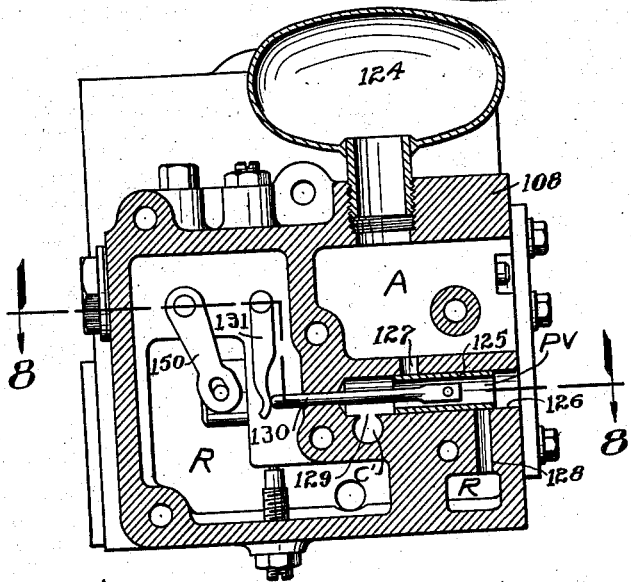
Figure 9:
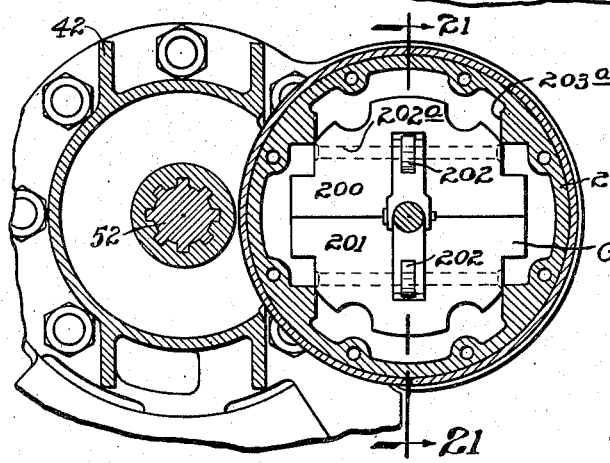
Figure 10:
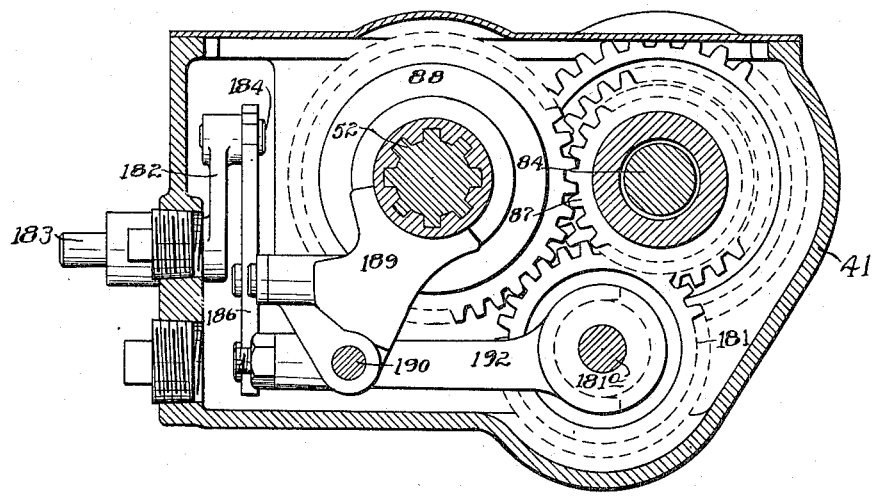
Figure 11:
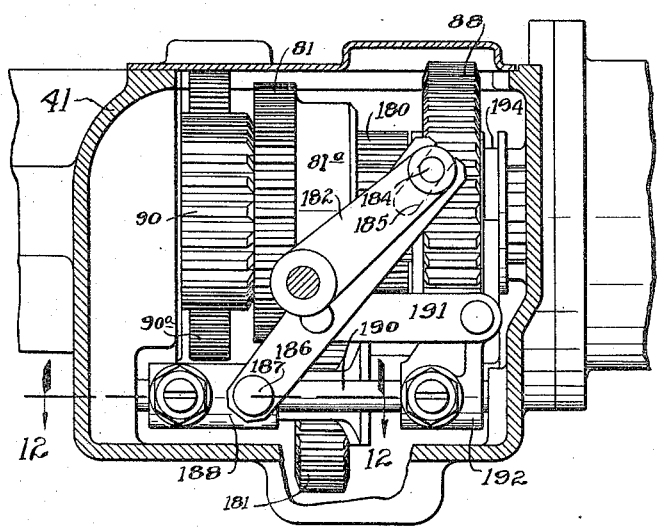

Figs. 9, 10 and 11 are sections on the lines 9—9, 10—10 and 11—11 of Fig. 1.

Figure 12:
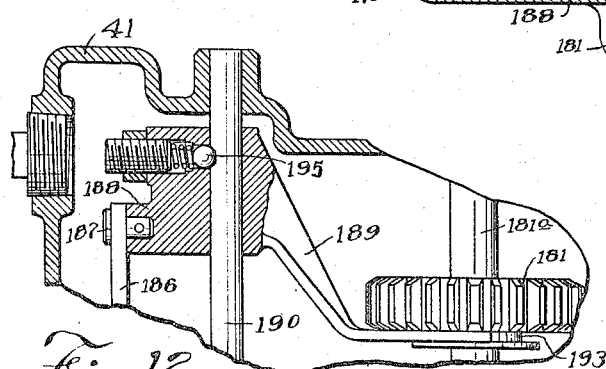

Fig. 12 is a section on the line 12—12 of Fig. 11.

Fig. 13 is a side elevation, partly broken away and partly in section, showing the manner of supporting the rear end of the transmission unit from the frame work of an automobile.

Fig. 14 is a section on the line 14—14 of Fig. 13.

Figure 15:
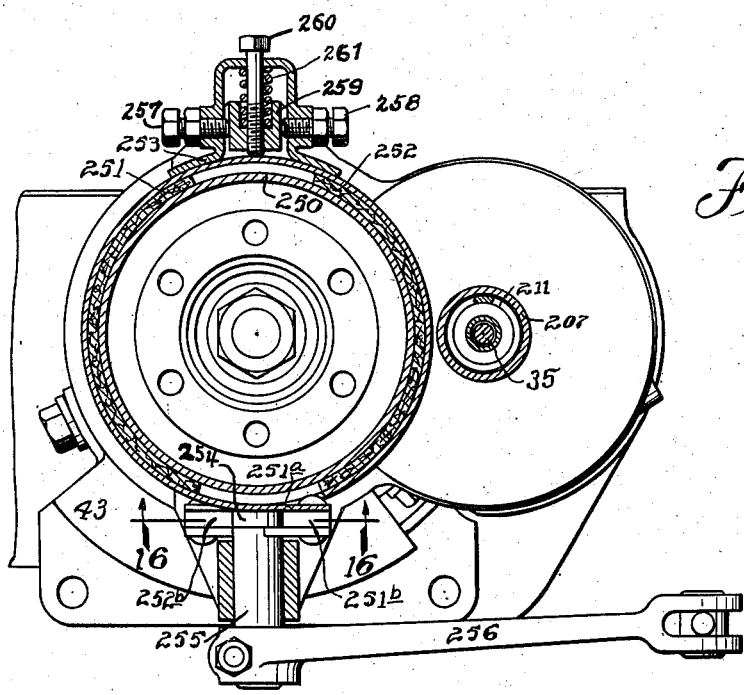

Fig. 15 is a section on the line 15—15 of Fig. 13, and showing the construction of a braking means on the propeller shaft of an automobile.

Figure 16:
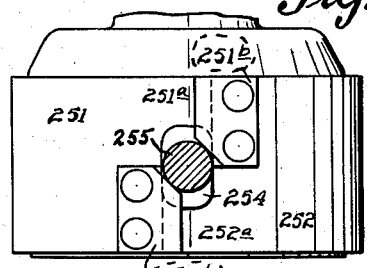

Fig. 16 is a section on the line 16—16 of Fig. 15.

Figure 17:
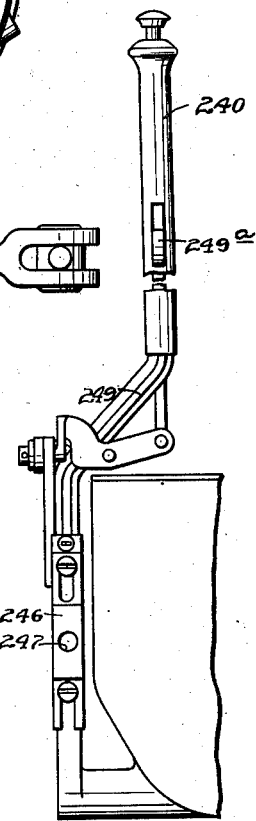

Fig. 17 is a section on the line 17—17 of Fig. 4.

Figure 18:
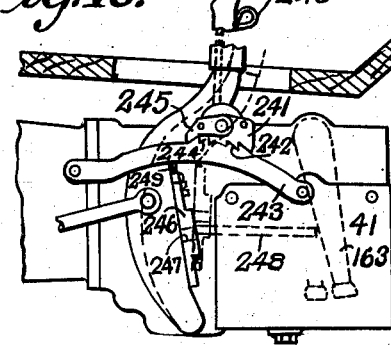

Fig. 18 is a side elevation showing a means for rendering the transmission effective under emergency conditions, such for example, as when a failure of the electric starter makes it desirable to start the engine by towing the car, this being effected through the manipulation of parts connected with the conventional hand or emergency brake lever of an automobile, the said lever being shown broken away.

Fig. 19 is a diagrammatic view to illustrate the general layout of the principal component parts of the fluid pressure system with the connecting conduits between such parts and Fig. 20 is another diagram to illustrate the manner in which the functions of throttle opening and vehicle speed are co-operatively employed to effect the various speed gear ratios.

Fig. 21 is a sectional view of the governor taken on the line 21—21 of Fig. 9.

Fig. 22 is a diagrammatic view showing the modification in which means are provided for automatically closing the throttle during the change-over from one speed gear ratio to another.

Fig. 23 is a fragmentary sectional view of a modified form of the selector valve, the showing corresponding to the showing of such valve in Fig. 5.

Fig. 24 is a section on the line 24—24 of Fig. 23.

Fig. 25 is a view similar to Fig. 23 of the pressure unloading valve, and

Fig. 26 is a section on the line 26—26 of Fig. 25.

The general nature of the invention will best be understood by reference first to the diagrammatic view of Fig. 19 in which the reference character P indicates a pump driven from the engine for pumping fluid under pressure to the various fluid operated clutches presently to be more fully described. The inlet side of the pump P is connected with a reservoir or sump R. Connected to the outlet side of the pump and interposed between said outlet and the main control valves of the system is an unloading valve U, the construction and operation of which will hereinafter be more fully set forth. The fluid from the pump passes through said unloading valve under conditions which will hereinafter be more fully described, and thence passes by the conduit C to a pressure control valve PV from which said fluid passes through the conduit C' to a selector valve S to be directed, according to the setting of the valve, to the cylinders and pistons, designated P1, P2, and P3, which actuate the clutches for the first gear, second gear and third gear forward drives respectively.

The selector valve S is provided with a longitudinally extending conduit which is at all times in communication with the conduit C' through which the fluid under pressure is delivered to said valve. This longitudinally extending conduit communicates in turn at its lower end with an annular passage formed in the valve, which passage is adapted to communicate with the conduits leading to the cylinders and pistons P1, P2 and P3, as will be readily understood from an inspection of Fig. 19. The selector valve is caused to be slid longitudinally through its casing to establish communication to said fluid pressure cylinders and pistons under the influence of a floating differential lever 30, the central part of which is connected to the slidable member of the selector valve by means of the valve rod 31. One end of the lever 30 is connected by means of a small rod 32 and pivoted lever 33 with the accelerator pedal 34, or other means for controlling the extent of opening of the throttle of the automobile engine. At its other end the lever 30 is connected by lost motion means through the connecting rod 35 with a governor indicated by the reference character G, and which governor is driven at a speed proportional with the speed of the vehicle, as will hereinafter be more fully described.

It is one of the principal objects of the present invention to provide a construction in which the automatic change-over of the transmission through the various speed changes will simulate, as closely as possible, the shifting of the gears manually in a selective sliding gear transmission when the car is being driven by a proficient driver. For example, when a driver wishes to speed his car up as rapidly as possible from a standing start, the throttle is usually opened quite wide. Under the conditions of wide open throttle the shift is made from one gear to another at relatively higher speeds than when, due to car load or other conditions, the car is started and accelerated more slowly. Engine load or torque may be employed directly for automatic transmission control, by the use of torque responsive controlling devices, but as such devices are of complicated and expensive construction, I prefer to employ the extent, or variation, of throttle opening coupled with speed of the car to control the gear ratios, the extent of throttle opening at any given car speed being indicative of the engine torque.

For example, the shift from low gear to second gear should be made at higher speed when accelerating than when in decelerating, the shift is made through the same gears in the reverse direction. These desired results and the proper coordination of vehicle speed and throttle opening are effected by the use of the differential or floating lever 30, which functions in the same manner as described in my co-pending application, Serial No. 603,823 hereinbefore referred to, and the operation of which can best be understood by reference to the diagrammatic views of Figs. 19 and 20.

As shown in Fig. 20, the plurality of inclined lines indicate various possible positions of the floating differential lever 30. The three dots and circles arranged vertically one above the other at the middle of the figure represent the approximate locations of the center of the lever 30 in which the selector valve S will be in a position to establish communication to the various cylinders and pistons for effecting first gear drive, second gear drive and third gear drive respectively. At the left hand side of the figure, the extent of movement of the left hand end of the lever 30 of Fig. 19 is indicated,—from the closed position of the throttle at the top, to the fully opened position at the bottom. Obviously the throttle may occupy any position between its fully closed and fully opened positions. At the right hand end of the figure is indicated the extent of movement of the lever 30 produced by the operation of the governor G in accordance with vehicle speed. As will be readily understood from a study of Fig. 20 variations of the two factors, viz: extent of throttle opening and vehicle speed will cause the floating lever 30 to occupy different positions and to move the selector valve through the valve rod 31 to establish communication with the conduits leading to the first gear, second gear and third gear cylinders and pistons.

In the diagrammatic showing, two positions 30 and 30ª of the lever 30 are shown for closed throttle. In the lower position 30ª with throttle closed and engine idling, the central portion of the lever 30 lies in the region for establishing communication to the first gear, but no fluid will flow to the first gear clutch until the accelerator pedal is depressed to open the throttle and also to actuate the control valve PV to opened position. When first gear is thus made operative the first gear connection will be maintained until, as the speed of the vehicle increases, the center of the floating lever reaches the region in which the selector valve will be moved to cause a shiftover from first to second gear, this shift taking place when accelerating at a vehicle speed of approximately eight miles per hour (as indicated at 30ᵇ Fig. 20) under the assumed calibration or adjustment of the elements depicted in the diagrammatic showing selected. For full opened position of the throttle, the shift from first gear to second gear would take place shortly after the right hand end of the lever, moving under the influence of the governor G, reaches the line corresponding to the speed of 14.8 miles per hour; while the shift from second to high with full opened throttle would take place when a speed of 38.5 miles per hour has been reached. Obviously for different positions of throttle opening, the speed at which the shift from one gear ratio to another would take place will vary in accordance with the throttle opening.

When the speed of the car is decreasing it is desirable to shift from a higher to a lower gear at a lower car speed than when shifting from lower to higher gear in accelerating, consequently means are provided to insure the gear shifts from higher to lower ratios at lower speeds and such means consists in the provision of a lost motion connection between the end of the governor rod 35 and floating lever 30, and consisting of a pair of spaced nuts 35ª adjustably secured on the rod 35 and between which the end of the lever 30 is interposed. In order to insure that the selector valve will be positively moved from one position to another, springs 35ᵇ are interposed between the nuts 35ª and the end of the lever 30, so that when the rod 35 is moved by the governor to cause a movement of the selector valve, the first action will be to compress one of the springs 35ᵇ and as soon as the pressure exerted by the spring on the floating lever is sufficient to overcome the holding effect of the spring pressed ball detent 152, the selector valve will be snapped to its next position. Throwing of the valve past such next position may be prevented by associating a dash pot D with one end of the movable member of the valve the dash pot preferably being connected by the pipe D' with the line leading to the sump R.

It is of course important that the pressure of the fluid which actuates the cylinders and pistons to throw the clutches into operative engagement for establishing the various gear ratios, be maintained with reasonable accuracy between certain maximum and minimum pressures. While substantially uniform delivery pressures in any pump may be effected by the use of the usual spring loaded by-pass ball valves, the use of such valves are objectionable for a pump which operates more or less continuously because of the fact that when the by-pass valves are opened the fluid is always pumped through such valves under pressure as determined by the spring loading which represents the performance of work that is dissipated entirely in the production of objectionable heating effects on the fluid being pumped. The use of such ball valves is obviated in the present invention and undesirable heating effects are avoided by the use of the pressure unloading valve U. This valve comprises a spring loaded piston having the upper end thereof reduced and projecting into a pressure receiving chamber A which is in communication with the delivery or outlet side of the pump and receives the full pressure delivered by the pump. The lower end of the unloading valve U contacts with a compression spring 117, the compression pressure of which may be regulated by an adjustable screw 118, and the valve is normally held in its fully opened or closed position by means of a small spring pressed ball detent 120. Let it be assumed that it is desired to maintain the pressure in the delivery line of the pump between 175 pounds per square inch and 200 pounds per square inch. The area of the small plunger of the unloading valve which projects into the pressure chamber A is relatively small so as to permit the use of a relatively weak spring 117 which may be adjusted so as, in combination with the resistance of the detent 120, to prevent downward movement of the valve until the pressure in the chamber A tends to exceed 200 pounds per square inch and so that the spring will insure upward movement of the valve when the pressure tends to fall below 175 pounds per square inch.

If the spring loaded ball detent 120, for example, be strong enough to resist a force of 12½ pounds per square inch exerted on the small end of the unloading valve and the screw 118 be adjusted to resist 187½ pounds, it will therefore take a pressure of 200 pounds per square inch in the pressure chamber to move the valve downwardly. When the valve is moved downwardly, communication is established by the unloading valve between the pressure line of the pump and the conduit B which leads back to the oil reservoir or sump R, the fluid then being by-passed back to the inlet side of the pump. As the pressure in chamber A drops, the valve will not be moved upwardly until such pressure reaches 187½—12½ or 175 pounds per square inch when the valve being moved upwardly by spring 117 communication will be established between the inlet side of the pump and the conduit C, all as will presently be more fully set forth in connection with the detailed description of the unloading valve U.

In order to avoid jerky clutch action, the pressure control valve PV is provided. As will be readily understood it is highly desirable to avoid instantly placing the full fluid pressure in communication with any cylinder and piston thus throwing any one of the clutches into operative engagement suddenly, as the sudden application of the clutch would result in very jerky functioning of the device. While bleeder and time controls have been resorted to for the gradual application of fluid pressure operated devices, such controls will not operate uniformly because a bleeder will always admit full pressure if held open continuously for any length of time. The construction and arrangement of the control valve PV, as hereinafter more fully set forth, is such that the fluid pressure delivered to any clutch at any instant is appropriately varied in accordance with the extent of throttle opening; low pressure and hence soft application for part throttle and full application for full or wide open throttle, thus, not only insuring better maneuvering performance, but preventing jerky clutch action under widely varying conditions of temperature, load and throttle openings. The pressure valve PV shown diagrammatically in Fig. 19 is designed to meet the above requirements. This valve briefly comprises an annular bushing 125 having connected to it one end of a connecting rod 130, the upper end of which terminates in an enlarged head against which abuts the lower end of the pressure valve loading spring 135, the upper end of said spring abutting against a bell crank lever 136. Connected at its upper end to the lever 33 of the accelerator pedal 34 is a push rod 137, the lower end of which engages with the said bell crank lever. When the accelerator pedal is depressed the push rod will exert a downward thrust upon the end of the bell crank lever 136 and tend to compress the pressure valve loading spring 135.

As the pressure unloading valve is intended to be actuated towards opened position by the depression of the accelerator pedal, it is important that it will not present too great a resistance to the actuation of said pedal, therefore the valve bushing 125 is balanced against pressure within the valve chamber and as the end of the small rod 130 is the only part of the valve subject to unbalanced pressure, the total upward pressure exerted on such rod will be comparatively small and such pressure may be overcome by lowering of the spring 135 in accordance with the extent of movement of the accelerator pedal and therefore also with the extent of throttle opening. As small throttle openings require light clutch pressure for smooth engagement, and large throttle openings require more pressure to transmit full engine torque, the clutch pressure should vary with throttle opening. The skillful driver does this with his clutch pedal, whereas this effect is obtained in the present invention by the operation of the pressure control valve. In the closed throttle position, with the valve in the position shown, there is no pressure upon the spring 135. Consequently, any fluid pressure in the valve casing (or in any cylinder P—1, P—2 or P—3) will tend to raise the bushing 125 against the spring 135 and open the lower or exhaust port letting fluid flow back to the sump until the pressure is relieved. The valve will then return to the position shown in which both inlet and exhaust ports are closed.

When the throttle is opened and spring pressure proportional to throttle opening is exerted, this pushes the bushing 125 down, uncovering the upper or inlet port of conduit C, thus admitting fluid which builds up pressure within the valve casing and when it becomes equal to the spring pressure, again raises the valve to the position shown in which both ports are closed. The bushing 125 also comes back to the position shown when the fluid pressure equals the spring pressure. If the throttle is opened, the spring pushes the valve down admitting more oil. If it is closed, the spring pressure is diminished and the fluid pressure raises the valve and lets oil out at the lower or exhaust port until the balance is again established. Fluid pressure is thus kept proportional to throttle opening.

In order to permit any clutch to be slipped into engagement during a gear change while preventing slippage during normal driving, the valve bushing 125 is of such length as to overlap the inlet and exhaust ports thereof when in neutral position. This in effect gives a limited lost motion between the beginning of the opening and closing positions of the valve, so that when the engine is idling the clutch may be slipped in but when driving with throttle nearly closed at low speeds the valve will hold the pressure to maintain the clutch in non-slipping engagement at a more nearly closed throttle position than that at which the valve opened.

We will now proceed with the detailed description of the various parts of the apparatus and for convenience and clarity the apparatus will be described with the following headings and subheadings:

Main housing and transmission gearing including:
   (a) Direct drive
   (b) Second gear drive
   (c) First gear drive
Fluid pressure system and valves thereof
Reverse gear
Vehicle speed governor control
Free wheeling lockout
Second gear brake
Manual operation
Transmission shaft brake
Modified automatic throttle control
Modified valve structures
Constructional and operative advantages.

Main Housing and Transmission Gearing

(Figs. 1, 2, 13 and 14)

The apparatus is contained within a housing (see Fig. 1) indicated generally by reference character H and which for convenience of fabrication and assembly preferably comprises a plurality of housing sections 40, 41 and 42 suitably secured together; the housing section 40 at its front end preferably being bolted directly to the engine. At its rear end the housing H is supported by means of a bracket 43 (see Figs. 13 and 14) bolted to the underside of the housing section 42. Said bracket at its lower end may be of channel cross section, as shown at 43ª, to receive a block 44 of any suitable resilient material, such as rubber, which is interposed between said bracket and a transversely extending supporting frame member 46. At its central part the section 43ª is provided with an upwardly projecting lug 45 which seats within a recess formed in the bottom wall of the housing 42.

Located within the chamber formed by the housing section 40 is a fly wheel 47 (see Fig. 1) provided on one side with an annular rearwardly projecting flange 48, which defines a cup-shaped recess into which projects the clutch housing member 49 for the direct drive and second gear clutches. Suitably supported by a bearing 50, in the end of the engine shaft 51 is one end of a drive shaft 52, the other end of which shaft is supported within a bearing 50ª and is adapted to be connected, by a conventional universal joint, a portion of which is indicated at 53, with the main or propeller shaft of an automobile.

The clutch housing 49 is provided with a hollow rearwardly extending boss 54, the end of which abuts against a ball bearing 55, having its outer race fixed within suitable recesses in a pair of keys 56 slidably mounted on suitable keyways formed within the inner wall of the housing section 41. The rear end of the housing section 40 has secured to it a member 57 provided with rearwardly extending hollow boss 58 which encircles the boss 54 of the clutch housing 49 and forms therewith an oil seal, said boss 58 being provided with a spiral groove 58ª which, when the boss 54 rotates, wipes the oil back into the gear casing. The clutch housing 49 is secured to the fly wheel 47 for rotation therewith by means which prevent, and tend to absorb, any sudden shocks or jerks. Such means comprises a plurality of arcuate shaped blocks 59 (see Figs. 1 and 2) each of which is secured to the fly wheel 47 by means of a pair of studs 59ª secured in the fly wheel and projecting into holes in the arcuate blocks. Each of the arcuate blocks 59 is provided at each end with a suitable recess in which is received a cushioning spring 62, the ends of which springs abut against pins 63 suitably secured to an annular flange 64 projecting laterally from the exterior of the clutch housing 49. Approximately midway between its ends each block 59 has secured in it the threaded end of a bolt 61 which passes through an elongated slot 60 in the flange 64 of the clutch housing. Threaded upon the other ends of the bolts 61 are nuts 65 which form abutments for the springs 66 which serve to hold a pair of friction discs 65ª with a yielding pressure against said flange 64, and thus assist the springs 62 in damping sudden jerks or shocks, one of said discs 65ª being held in contacting engagement with one face of the flange 64 and the other in engagement with the other face of said flange 64. When the clutch housing is moved longitudinally, by means presently to be described, to place either the direct or second gear in operation, the arcuate blocks 59 are moved longitudinally with the clutch housing upon the studs 61.

(a) Direct drive (Fig. 1)

Situated within the clutch housing 49 are the clutches for direct and second gear drive. The direct drive clutch comprises a clutch member 67 having a hollow central boss which is splined to the drive shaft 52. The exterior of said boss is provided with a plurality of splines with which are engaged a plurality of clutch discs 68, interposed between clutch discs 69 splined at their outer periphery to the interior of the clutch housing 49. The clutch member 67 is provided at one end with a disc section 67ª which forms at one end an abutment for the clutch discs 68, 69 and said clutch member 67 is secured against movement longitudinally of the shaft 52 by means of a split ring 70 suitably seated within an annular recess provided in the shaft 52 and furnishing an abutment against which the clutch member 67 engages. Located substantially midway within the interior of the housing 49 is a second abutment plate 71 which is secured against longitudinal movement relatively to the clutch housing 49 by means of the split retaining rings 72 seated within suitable annular recesses formed in the inner cylindrical wall of the housing 49 and engaging the abutment plate 71 on each side thereof.

The application of the direct drive clutch is effected by imparting a longitudinal movement to the clutch housing 49, from right to left in Fig. 1, by means presently to be more fully described. This longitudinal movement of the clutch housing is imparted to the abutment member 71, and then successively in turn through the clutch discs 69 and 68 to the abutment plate 67ª of the clutch member 67, the thrust of the clutch plates being transmitted directly to the shaft 52 through the retaining ring 70. When the clutch discs 68—69 are held in contacting engagement the drive is then transmitted, in a manner which will be readily understood, directly from the fly wheel 47 at engine speed to the shaft 52, to be carried directly through said shaft to the universal connection 53 of the propeller shaft of the vehicle.

(b) Second gear drive (Fig. 1)

The clutch housing 49 also contains the clutch for the second gear drive and this comprises a clutch member 73 somewhat similar in construction to the clutch member 67 and having a central boss 73ª splined or keyed to a hollow sleeve 74; the latter surrounding the shaft 52 in concentrically spaced relation thereto and extending rearwardly a considerable distance into the housing section 41; said sleeve being rotatably supported in roller bearings 75—76 interposed between it and a second rotatable sleeve 77, presently to be more fully described. The outer periphery of the boss 73ª of clutch member 73 is provided with a plurality of splines with which are engaged the clutch discs 78 interposed between the clutch discs 79, which are splined at their outer periphery to the inner wall of the clutch housing 49. Adjacent its front end the sleeve 74 is provided with a shoulder 74ª against which the rear face of the clutch member 73 abuts and at its rear end said sleeve abuts against a ball bearing 80 held between a split ring 74ᵇ seated in a groove of shaft 52 and a shoulder formed on said shaft. When the clutch housing 49 is shifted longitudinally from left to right in Fig. 1, the clutch discs 78—79 will be held in driving engagement and the rotation of the fly wheel 47 will be imparted to the sleeve 74. At its extreme rearward end the sleeve 74 is provided with a cup-shaped recess for the reception of a ball bearing 80 interposed between said sleeve and the shaft 52. Immediately adjacent to, and in abutting relationship with the ball bearing 80, the sleeve 74 is provided with a gear 81, the teeth of which mesh with a gear 82 formed on a sleeve 83 rotatably mounted upon the countershaft 84, roller bearings 85—86 being interposed between said countershaft and sleeve. The sleeve 83 has also formed upon it a gear 87 which meshes with a gear 88 keyed to driveshaft 52. When the second gear clutch plates 78—79 are in driving engagement the drive will be transmitted from the fly wheel 47 to the clutch housing 49 and thence through the clutch discs 78, 79, the sleeve 74, gears 81, 82, 87 and 88 to the drive shaft 52 and thence through the connection 53 to the propeller shaft.

As will be seen from an inspection of Fig. 1, the gear reduction provided by the gears 81, 82, 87 and 88 will effect the driving of the vehicle at the lower second speed gear ratio.

(c) *First gear drive (Fig. 1)*

The sleeve 77 above referred to is keyed to the rearwardly extending boss 54 of the clutch housing 49 by means of the keys 89 and consequently said sleeve 77 will be driven continuously at engine speed when the engine is operated. At its rearward end, the sleeve 77 is provided with a gear 90, which abuts against the face of the ball bearing 55 which it will be remembered is carried by the sliding keys 56. The clutch housing 49 and sleeve 77 are also secured together to move as a unitary structure both in longitudinal fore and aft movement by means of a dowel 77ᵃ threaded into the boss 54 and having at its inner end a teat which engages within a suitable hole in sleeve 77. The teeth of gear 90 mesh with the teeth of a gear 90ᵃ splined upon the countershaft 84. At its rearward end, the shaft 84 is provided with a plurality of external splines with which are engaged the clutch discs 91 of the first gear clutch. These clutch discs 91 are interposed between clutch discs 92 splined at their periphery to the inner wall of a clutch housing 93. The housing 93 is provided with a central apertured boss 93ᵃ which projects forwardly and is splined to the countershaft sleeve 83, the housing 93 and sleeve 83 thereby forming a unitary structure which is rotatably mounted between a ball bearing 94, and the roller bearings 85, 86 hereinbefore described and located between the sleeve 83 and countershaft 84, the latter also being supported by a ball bearing 95 interposed between the forward end of said shaft 84 and a bearing block 96 located within a cylinder formed in the housing section 41, while the ball bearing 94 is interposed between the sleeve 83 and a bearing boss 41ᵃ formed on the rear wall of the housing section 41.

An abutment plate 97 for actuating the first gear clutch discs 91, 92 is secured to the shaft 84 by means of a split retaining ring 98, and a second abutment plate 99 for said clutch is secured to the inner wall of the housing 93 by means of a ring 100. The movement of the clutch plates 91, 92 into contacting engagement is effected by shifting the shaft 84 longitudinally by means which will presently be described.

In order to effect disengagement of the first gear clutch, a spring 101 is seated within a recess formed in the rear end of the shaft 84 and said spring bears against a plug 102 slidably mounted in an adjustable screw cap 103 threaded into the end of said shaft 84. The plug 102 is provided with a reduced end which projects through a central aperture of said screw cap 103 and is adapted to engage with the abutment plate 99.

When the shaft 84 is shifted longitudinally from left to right to actuate the clutch discs 91, 92 into driving engagement, the drive will be transmitted from the engine shaft through the fly wheel 47, clutch housing 49 to the sleeve 77, which it will be remembered is keyed directly by keys 89 to said clutch housing 49 and operates continuously at engine speed. The drive is then transmitted through the gears 90, 90ᵃ to the shaft 84, clutch plates 91, 92 to the clutch housing 93 and thence back through the sleeve 83 to rotate said sleeve at the same speed as the shaft 84; thence the drive passes through the gear 87 to the gear 88 to the driveshaft 52 and connection 53 thereof to the propeller shaft. It will be noted that although the same gears 87, 88 are employed for effecting drive to the driveshaft 52 for both first speed and second speed drive, first speed drive is obtained from the countershaft 84 driven by the gears 90, 90ᵃ, whereas second speed drive is effected directly through the sleeve 83 through the gears 81, 82 and thence to the gears 87, 88. It will be seen that the gear reduction between the gears 90, 91 is considerably greater than that between the gears 81, 82, hence low or first speed drive will be at a lower gear ratio.

When either first gear or direct drive is operative, the sleeve 83 and housing 93 will be rotated in accordance with the speed of the driving shaft and as said sleeve 83 is continuously geared with the sleeve 74 through the gears 81, 82, the sleeve 74 will of course be rotated but the rotation of the latter will be an idle or free rotation as said sleeve 74 is not connected in operative relation with either the engine or driving shaft 52 except when the second gear clutch is in engagement.

FLUID PRESSURE SYSTEM AND VALVES THEREOF (*Figs. 1, 3, 4, 5, 6, 7, 8, 9 and 19*)

The forward end of the countershaft 84 is connected by a self-adjusting tang and groove connection 104 (see Figs. 1 and 7) with a pump shaft 105 to which is keyed, or otherwise suitably secured, a rotary pump of the radial vane type, the constructional details of which form no part of the present invention. This pump, designated generally by the reference character P, is located within a cylindrical chamber 106, (see Figs. 1 and 3) formed within the housing section 41. Communicating with the cylindrical chamber 106 is the outlet conduit 107 (Fig. 7) which leads to the pressure unloading valve U. The pump chamber 106 also communicates through the inlet conduit 106ᵃ (see Fig. 3) with the sump R. The pressure unloading valve U (see Figs. 5 and 7) is located in a valve casing 108 bolted to the side of the main housing section 41, and consists of a valve plunger 109 slidably mounted within a chamber 110 formed in said valve casing. The valve plunger 109 has at one end thereof a reduced head 111 which projects into the pressure receiving chamber A formed in the casing 108. Intermediate its ends the valve plunger 109 is provided with an annular recess or groove 112 which is adapted to align with a pair of aligned ports 113, 113ᵃ in the wall of the chamber 110, and which communicate respectively with the outlet conduit 107 of the pump and the pressure receiving chamber A.

The plunger 109 is also provided at its inner end with a longitudinal slot 114 which communicates with a bore 115 provided centrally of said plunger. At its other end the bore 115 of the plunger 109 is counterbored, as indicated at 116, to receive a compression spring 117, one end of which abuts against the inner end of said counterbore and the other end of which abuts against an adjustable screw plug 118. That end of the chamber 110 of the unloading valve U adjacent the open end of counterbore 116, communicates through the port 119 with the oil receiving chamber or sump R.

As the pump P is connected to the countershaft 84 by the tank and groove connection 104, and as the countershaft 84 is continuously driven from the engine by the gears 90, 90ᵃ and the keyed connection of the sleeve 77 to the clutch housing 49, the pump P will be rotated at all times when the engine is operating, and the fluid under pressure will be delivered by the pump through the outlet conduit 107 thereof. With the unloading valve in the position shown in Fig. 7 of the drawings, the fluid will pass through the conduit 107 and port 113 around the annular groove 112 and through port 113ᵃ to the pressure receiving chamber A. The strength of the spring 117 and the pressure of the spring pressed ball detent 120 is so proportioned as to resist any inward movement of the valve plunger 109 until the pressure within the chamber A exceeds the predetermined maximum, as hereinbefore described. Should the pressure exceed this maximum, the force exerted on the reduced end of 111 of the valve plunger 109 will cause the plunger to be moved towards the right in Fig. 7 and when the longitudinal slot 114 in the plunger comes into registry with the port 113, the fluid under pressure from the pump will be by-passed through the bore 115, counterbore 116 and port 119 to the sump or oil receiving chamber R.

Figure 7:
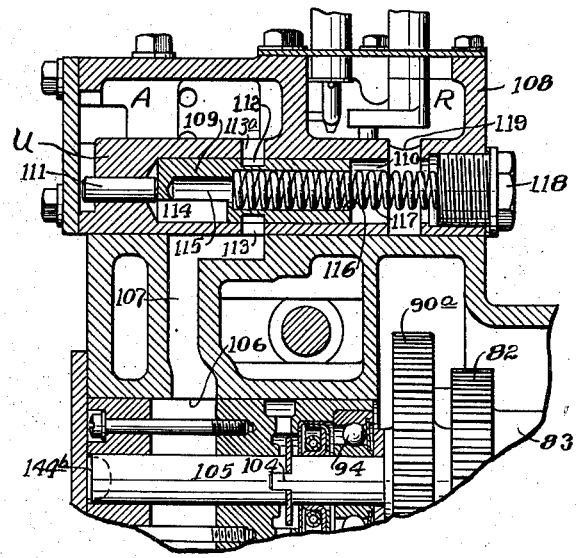
Fig. 7 is a section on the line 7—7 of Fig. 5.

Too rapid fluctuation of the plunger 109 is prevented by means of the spring pressed ball 120 (see Fig. 5) which is adapted to engage with a pair of recesses 121 and 122 provided in the outer periphery of the plunger 109 and so arranged relatively to said ball as to hold the plunger 109 in the position shown in Fig. 7 in which communication is established between the pump and pressure receiving chamber A, or in the position in which communication is established between said pump and the sump R. Should the pressure within the pressure chamber A tend to mount very rapidly, and thereby cause the plunger 109 to be projected past the point of engagement of the recess 122 with the ball 120, such an action would be prevented by the stop bolt 123 which limits such outward movement of the plunger to the point where the recess 122 will engage the ball 120.

In order to relieve the fluid pressure system of shocks resulting from variations in the fluid pressure, an air pressure chamber forming member 124 (see Fig. 6) is secured to the upper side of the housing 108 and is in communication with the pressure receiving chamber A, said air chamber 124 functioning to provide a reserve supply of fluid under pressure which is drawn upon when a speed gear change occurs and so that when fluid is withdrawn for actuating any clutch, there will be a momentary pressure drop to facilitate smooth clutching and a gradual increase of clutch pressure as the pump replenishes the supply of fluid in said chamber.

The pressure control valve PV, hereinbefore briefly described, consists of a bushing 125 (see Figs. 6 and 8) slidably mounted in a cylindrical chamber 126 formed in the valve casing 108, which chamber communicates through the port 127 with the pressure receiving chamber A and through the port 128 with the sump or oil receiving chamber R. It also communicates through the port 129 (see Fig. 8) with the conduit C' that leads to the selector valve.

The bushing 125 has connected to it one end of a push rod 130, the other end of which abuts against one arm 131 of a bell crank lever which projects through the wall of the valve casing 108 and is provided with a second lever arm (not shown), from which suitable connection is made to the accelerator pedal through the interposition of the spring 135 and bell crank 136 shown in the diagrammatic view of Fig. 19. The spring 135, as hereinbefore described, abuts against the bell crank lever 136 and the push rod 137 serves to transmit motion imparted to the accelerator pedal to open the throttle through the spring 135 and bell crank lever 131 to the push rod 130 of the pressure control valve. As before pointed out, the area of the rod 130 and the compression load upon the spring 135 are so proportioned that the bushing 125 will, when the throttle is closed, be held by the fluid pressure within the system in such position as to shut off communication between the interior of the chamber 126 and the ports 127 and 128. When the accelerator is depressed to open the throttle valve of the engine, the extra compression placed upon the spring 135 through the downward movement of the rod 137 will be sufficient to overcome the unbalanced pressure upon the end of the small push rod 130, and the bushing 125 will therefore be moved to uncover the port 127 and establish communication through the chamber 126 to the port 129, which communicates with the conduit C' leading to the selector valve.

As hereinbefore pointed out the pressure on the bushing 125 being balanced and the operation of the pressure control valve being effected by the relatively small force exerted on the end of the valve rod 130, subject to the variable counteracting effect produced by the loading of the spring 135 by the depression of the accelerator, the pressure within the valve chamber 126 will vary in accordance with the throttle opening. The pressure control valve being interposed between the selector valve and the pressure side of the pump, the pressure of the fluid delivered to any cylinder and piston can not therefore be greater than that in the chamber 126 and in accordance with the extent of throttle opening.

The selector valve comprises a hollow sleeve or bushing 140 (see Figs. 5 and 8) slidably mounted within a cylindrical chamber 141 provided in the valve casing 108. This sleeve 140 is provided on each side thereof with a longitudinally extending recess 142 which communicates at the one end with an annular recess 143 which is adapted to be brought into registry with the ports 144, 145 and 146 (Fig. 8) to establish communication to the cylinders and pistons for the actuation of the clutches for first gear, second gear and high gear or direct drive respectively. The sleeve 140 is also provided with the ports 147, 148 and 149 which communicate through the wall of the sleeve with the hollow bore thereof and thence with the oil receiving chamber or sump R, as will be readily understood from an inspection of Figs. 7 and 8 of the drawings. Secured to one end of the selector valve is one arm of a bell crank lever 150 which lever is journaled in the side wall of the valve casing 108, and has an arm (not shown) on the exterior of said casing to which is suitably connected the connecting rod 31 leading to the floating lever 30. In order to hold the selector valve with its ports in proper registry with the ports leading to the cylinders and pistons for actuating clutches for the various gears, the outer wall of the sleeve 140 is provided with a plurality of depressions 151 adapted to be engaged by the spring pressed ball 152. The low gear port 144 communicates with a conduit 144ª that extends horizontally and terminates in the port 144ᵇ (Fig. 7) in the end of the cylinder 106 of the pump P. When the selector valve is in the position shown in Figs. 5, 8 and 19 of the drawings, fluid under pressure from the pump passes through the unloading valve U, conduit C', the pressure control valve PV, the elongated slot 142 of the selector valve and annular groove 143 thereof to the port 144, conduit 144ª and port 144ᵇ in the end of the pump cylinder 106, and pressure will be exerted upon the end of the pump P to cause the same to be moved towards the right in Fig. 1. This movement of the pump will be communicated to the shaft 84 to cause it to be moved towards the right, carrying with it the abutment plate 97 of the low or first gear clutch and thus to cause the clutch plates 91, 92 to be held in contacting driving engagement.

When the selector valve is moved, under the action of the floating differential lever 30, to bring the annular groove 143 of such valve into registry with the port 145 for second gear, fluid will pass through the port 145 to the conduit 155 to the cylinder and piston P—2 for actuating the clutch for second gear.

It will be remembered that engagement of the clutch for second gear and direct drive is effected by the longitudinal movement of the clutch housing 49 and that the end of the boss 54 of such clutch housing abuts against the ball bearing 55 which is carried in the sliding keys 56. The sliding keys 56 as shown in Fig. 1 are provided with the yoked portions 160, with which are engaged the ends of a clutch actuating yoke 161. (Fig. 3.) The yoke 161 is formed integrally with or keyed to the bearing shaft 162 suitably journaled in the housing section 41 and said shaft carries at one end thereof a downwardly depending lever arm 163 the lower end of which is provided with a ball 164. This ball is located within a recess formed between the pistons of the cylinders and pistons P—2 and P—3 for second and high gear. The construction of each of these pistons is similar, both pistons preferably, for simplicity of manufacture, being constructed as one integral piece, and each consists of a piston member 165 (Fig. 4) slidably mounted within a cylinder 166 formed in the housing 41. One end of each piston 165 is counterbored for the reception of a coil spring 167, a spring retaining cap 168 preferably being provided within the counterbore of the piston. This spring retaining cap has one end thereof swaged over the head end of a small rod 169, to the other end of which is secured a spring abutment member 170 which bears against the cylinder head 171. When the piston 165 of the cylinder and piston P—2 is placed in communication with the fluid pressure through the conduit 155, the lever 163 will be swung rearwardly and this movement of the lever will be communicated through the yoke 161 to the sliding keys 56 and thence through the ball bearing 55 to the sleeve 77 and clutch housing 49. The clutch housing 49, upon being moved towards the right in Fig. 1, causes the clutch for second gear drive to be placed in operative driving relationship, such drive being effected through the sleeve 74, gears 81, 82, 87 and 88 as hereinbefore described.

When the selector valve is moved by the floating lever 30 to effect direct driving, the annular groove 143 of the selector valve sleeve 140 will be moved into alignment with the port 146. The fluid under pressure will then pass through the conduit 172 to the end of the right hand cylinder 166, shown in Fig. 4, and will cause the piston 165 thereof to be moved towards the left, thereby moving the lever 163 forwardly and causing the sliding keys 56 to be moved forwardly, said keys carrying with them the ball bearing 55 and actuating the clutch housing 49 so as to place the high gear clutch in driving relationship, the drive being effected directly from the engine to the driveshaft 52 in the manner heretofore described.

Figure 8:
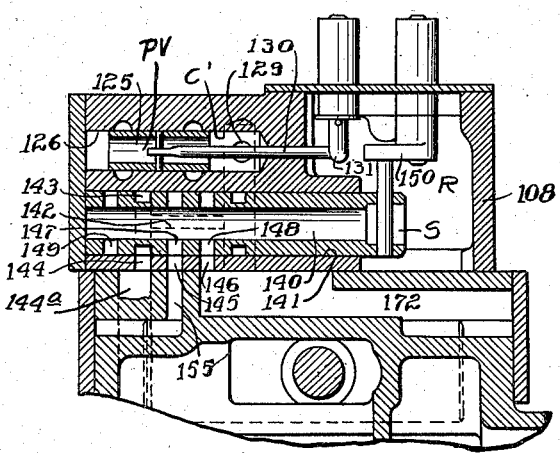
Fig. 8 is a section on the line 8—8 of Fig. 6.

As will be seen from the showing of the selector valve in Figs. 5 and 8 of the drawings, as well as from the diagrammatic view of Fig. 19, when the annular groove 143 of the selector valve is in alignment with the port 144 for low gear drive, the ports 147 and 148 are in alignment with the ports 145 and 146 respectively, thus placing the cylinders and pistons for the second and high gear clutch in communication with the sump through the bore of the valve sleeve 142. When the groove 143 is in alignment with the port 145 for second gear drive, the port 147 will register with port 146, and port 149 with port 144 to place the low and high gear cylinders in communication with the sump, while when groove 143 is in registry with the high gear port 146 the second gear port 145 will be in communication with the sump through the port 149 and as the lower end of the sleeve will have been moved entirely past the low gear port 144, communication to the sump for the low gear port 144 will be established around the lower end of the sleeve and through the hollow bore thereof.

REVERSE GEAR (Figs. 1, 10, 11 and 12)

Reverse drive is effected by a purely manual operation and for this purpose the countershaft sleeve 83 is provided with a gear 180 with which is adapted to mesh an idler gear 181 (see Figs. 10 and 11) slidably mounted upon a jackshaft 181ª located below and between the countershaft 84 and the driveshaft 52. When said idler gear 181 is slid into alignment with the gear 180 and with the gear 88, the reverse driving connection is effected. However, it is necessary first to disengage the gear 88 from the gear 87 and means are provided for sliding the gear 88 longitudinally out of mesh with the gear 87 and subsequently sliding the idler gear 181 longitudinally to cause said idler to engage with the countershaft gear 180 and also with the gear 88 of the driveshaft 52. This means comprises a lever arm 182 suitably journaled in the side wall of the housing section 41 (see Fig. 10) and having a shaft 183 projecting exteriorly of said housing section and to which any suitable manually operable lever may be secured. Projecting from the free end of the lever 182 is a pin 184 which engages within an elongated slot 185 formed in one end of a lever arm 186. The other end of the lever arm 186 is pivotally connected, as at 187, to the boss 188 of a sliding yoke 189, the yoke 189 being mounted for movement longitudinally along a rod 190 suitably secured within the housing 41. At a point intermediate of its ends, the lever 186 has pivotally connected to it, one end of a connecting link 191, the other end of which is secured to a second sliding yoke 192, also slidably mounted upon rod 190. The yoke 189 engages within a suitable groove 193 formed in the idler gear 181 while the yoke 192 is engaged within a similar groove 194 formed in the small rearwardly extending boss of the driveshaft gear 88.

In order to insure the demeshing of the gear 88 from the gear 87 before the idler gear 181 is thrown into mesh with said gear 88, the yoke arm 189 is held in a position in which the gear 181 is inoperative by means of a spring pressed ball 195 (Fig. 12) which engages within a detent or groove in the rod 190. When the reverse gear shift is manipulated to place the reverse gears in operative engagement, the lever arm 182 is rotated in a counter clockwise direction (Fig. 11) so as to cause the upper end of the lever to move from the right to the left, as seen in this figure of the drawings. Due to the advantage of the lever arms, and also to the holding of the yoke arm 189 by the spring pressed ball 195, the first result of the movement of the lever arm 182 in the manner above described will be to cause the lever arm to swing upon the pivot 187 thereof, the spring pressed ball 195 tending to hold the yoke 189 against movement. A pull will therefore be exerted through the connecting link 191 upon the yoke 192, thus sliding the gear 88 to the left (Fig. 11) and disengaging said gear from the countershaft gear 87. After the gear 88 has been completely disengaged from the gear 87, further movement of the gear 88 towards the left will be prevented by the face of said gear 88 coming in contact with the extended boss 81ᵃ of the gear 81. Continued movement of the lever 182 will result in transferring the pivotal point of the movement of the lever 186 to the connection of said lever with the connecting link 191. The lower end of the lever 186 will then be moved from the left towards the right in Fig. 11, thus sliding the idler gear 181 into engagement with the countershaft gear 180 and also into engagement with the teeth of the gear 88. The construction and arrangement of the levers 183—186 and associated parts, are such as to insure not only the demeshing of the main shaft gear 88 from the countershaft gear 87, but also to insure the meshing of the idler gear 181 with the countershaft gear 180 before said idler gear is brought into mesh with the main shaft gear 88. This order of meshing is essential since as neither the idler gear 181 nor main shaft gear 88 is rotating, it might be impossible to mesh 181 with 88 if the gear teeth should be out of alignment, however, if the idler is first placed in mesh with the countershaft gear 180, misalignment of the gear teeth may be corrected by imparting a slight rotation to the countershaft gear 180 and idler 181 through the first gear clutch.

VEHICLE SPEED GOVERNOR CONTROL
(Figs. 1, 9, 19 and 21)

The automatic controls for the selector valve have been briefly described in connection with diagrammatic showing in Fig. 19 of the drawings. As will be understood, the connection from the accelerator 34 to one end of the floating lever 30 may be made in any suitable manner. The end of the floating lever 30 with which the push rod 32, operated by the accelerator pedal, engages, is held up into contact with said push rod by means of a spring 32ᵃ. At its other end the floating lever 30 has a lost motion connection through the nuts 35ᵃ and springs 35ᵇ with the rod 35 which leads to the governor indicated generally by the reference character G in Fig. 19. Although any suitable type of governor may be employed, I prefer for compactness of construction, the use of a governor of the type shown in Figs. 1 and 9 of the drawings, and which consists of a pair of weights 200 and 201 mounted within an extension of the first gear clutch housing 93. Each of these weights carries a small roller 202, the peripheries of which engage with the inner walls of the governor housing 203, as shown in Fig. 21. Each governor weight has a reduced portion towards its outer periphery that engages slidably between a pair of guide ways 203ᵃ formed in the interior of the governor housing 203. At their inner ends each weight is provided with a radially extending slot 204 within which the rollers 202 are rotatably mounted upon pins 202ᵃ which extend through the respective governor weights. Spanning each roller 202 is the yoked end of a curved connecting link 205, said yoked ends of the link 205 being apertured for engagement with the pins 202ᵃ. The other ends of the links 205 are pivotally secured by a pin 205ᵃ to a plug 206 slidably mounted within a sleeve 207 secured within a hollow projecting boss 208 of the governor housing 203. The inner end of the sleeve 207 terminates in an inwardly projecting flange which forms an abutment for one end of a spring 209, the other end of which spring abuts against an enlarged head 206ᵃ of the plug 206. A second spring 210 encircles the plug 206 and cooperates with spring 209 normally to urge the plug 206 outwardly of the sleeve 207 and boss 208. The connection between the plug 206 and the connecting rod which leads to the floating lever 30 is effected through a small rod 211 seated within a bore formed in the end of the plug 206. This rod 211 is mounted within a ball bearing 212 and has a reduced threaded end which is screwed into a yoked connecting rod 213, the rod 213 passing slidably, but non-rotatably, through a suitable packing gland 214 seated within the outer end of the sleeve 207.

The operation of the governor will be readily understood. As the main shaft gear 88 remains in mesh with the countershaft gear 87 for all conditions of forward drive, during which automatic operation of the transmission is effected, the sleeve 83 with which the gear 87 is formed integrally will always be driven at a rate proportional to the speed of the propeller shaft of the automobile, and, therefore, the speed of rotation of the sleeve 83 will always be proportional to the vehicle speed. As the clutch housing 93 is secured to the sleeve 83 and rotates in unison therewith, the clutch housing will also rotate at a speed proportional to the vehicle speed, and as the clutch housing 93 rotates, the weights 200, 201 of the governor will be caused to move under the influence of centrifugal force outwardly from the axis of rotation of the governor in an amount dependent upon the vehicle's speed. The outward movement of the weights 200, 201 will be communicated through the plug 206 and rod 213 to the connecting rod 35, the connecting rod 35 being connected at its outer end to the floating lever 30 and causing the right hand end of the lever to be moved upwardly in response to the increase of vehicle speed as indicated in the diagrammatic view in Fig. 20, thereby causing automatic shifting of the selector valve and a consequent effecting of first, second or third gear drive, as will be readily understood from a consideration of the diagrammatic view in Fig. 20 and from the foregoing disclosure.

The particular construction of the governor control as above described has marked advantages for use in connection with an automatic transmission of the type herein disclosed because of the simplicity and compactness of the structure, with the two weights 200, 201, completely enclosed within a small housing and guided therein for simple in and out radial movement, thus enabling the simple reciprocating movement of the weights to be employed directly to produce the desired actuation of the floating lever 30 through the rod 35 without necessitating the use of any complicated system of links and levers such as are commonly used on centrifugal governors to obtain the desired differential action necessary to compensate for the rapid increase in centrifugal force at the higher speeds. It is to be noted that due to the angularity of links 205, the latter under the influence of the springs 209, 210 serve to pull the weights normally inwardly towards the axis of rotation, thereby to resist the outward movement of the weights under centrifugal force. Attention is called to the fact that the inner spring 210 is shorter and heavier than the outer spring 209, so that at the lower speeds the much feebler centrifugal forces resulting at such speeds are resisted by the outer spring 210, whereas, in the higher speed ranges, and greatly increased centrifugal forces resulting therefrom, both the outer and inner springs become effective to resist the outward movement of the weights 200, 201, and cooperating to secure, what may be termed, a differential spring action.

A governor constructed in accordance with the above principles is therefore not only highly advantageous for use in an automatic transmission of the type herein disclosed because of its simplicity and therefore low cost of manufacture, but also on account of its compactness which enables it readily to be incorporated directly into the transmission housing, and in addition because all the moving parts thereof may be entirely enclosed within a small housing and completely sealed against access of road dust, dirt and grit.

In addition to the automatic shifting of the gears by the floating lever, the constructional arrangement of the pressure control valve and its associated parts is such that, as hereinbefore explained, the pressure control valve will be held normally in a position such as to cause the ports 127 and 128 to be closed, and to trap, as it were, the fluid pressure communicated to any cylinder and piston in accordance with the extent of throttle opening. And whenever the accelerator pedal is released the pressure existing within the chamber 126 and such cylinder and piston will cause the valve 125 to be moved to uncover the port 128 and thereby permit the trapped fluid to flow back to the sump and release the clutch then in engagement. The release of any of the clutches in this manner, i. e., by the release of the accelerator pedal, therefore establishes a free wheeling condition, because it is not accompanied by the engagement of any other clutch, but all clutches being disengaged there will be under these conditions no driving connection between the engine and propeller shaft.

FREE WHEELING LOCKOUT (Fig. 19)

The following means have been provided to render the free wheeling function inoperative when this may be desired:

The free wheeling lockout button 215 is secured in any readily accessible location, such for example, as on the dash 216 of the automobile. This button is connected by means of a Bowden wire 217, with a small stop or collar 218 placed in proximity to one of the lever arms of the bell crank lever 136. When the button 215 is pushed inwardly the collar 218 is moved into engagement with the bell crank lever 136 to move such lever into a direction such as to prevent the pressure upon spring 135 from being released when the accelerator pedal is released. The loading thereby being maintained upon the spring 135 will therefore be sufficient to prevent the valve bushing 125 from opening the port 128 when the accelerator pedal is released. In order to avoid stalling of the engine at low speeds or when bringing the vehicle to a stop, at such times as the free wheeling lockout is operative, automatic control and release of the free wheeling lockout may be effected at a predetermined desired speed by connecting the governor to the anchor 217$^a$ of the tube of the Bowden wire 217. This connection may comprise a rod 217$^b$ having a roller 217$^c$ at one end thereof for engagement with a notch formed in the extension of the governor connecting rod 35 and so arranged that when the vehicle has slowed down to such predetermined desired speed, the roller will drop into the notch on the rod 35 and thus permit the anchor 217$^a$ of the Bowden wire tube to move to the left, thereby permitting the stop 218 to move to the left and out of engagement with the bell crank lever 136, and thus unload spring 135.

SECOND GEAR BRAKE (Fig. 19)

As is well known, it is of course at times not only desirable, but sometimes essential, in traveling down a steep hill, for example, to keep the gears of the car locked in second drive in order to use the braking effect of the engine's compression. Means are provided in the present invention to accomplish this result, and such means comprise a manually operable button 220 (see Fig. 19) which preferably is arranged in any convenient position upon the floor boards of the car adjacent to the driver to be actuated by the driver's foot. The button 220 has connected to it a Bowden wire 221 which is supplied with a stop or collar 222, similar to the stop 218 for engagement with the bell crank lever 136, the stop 222 functioning in a manner similar to the stop 218 to prevent the pressure upon spring 135 from being released when the throttle is released, thereby preventing the movement of the pressure control valve PV to a position which would establish free wheeling. The Bowden wire 221 is extended beyond the bell crank lever 136 and is connected to a bell crank lever 223, one arm of which engages with a collar 224 suitably secured upon the connecting rod 31 leading to the selector valve. When the button 220 is depressed, the stop 222 will engage the bell crank lever 136 to load the spring 135 of the pressure control valve PV thus insuring that the said valve will be held open to permit the fluid to flow from conduit C to conduit C', and the bell crank lever 223 will also be actuated by the stop 222 to push the selector valve down to the position for establishing communication to the piston and cylinder P2 for second gear drive.

It will thus be seen that when the button 220 is depressed the second gear clutch will be held in operative clutching engagement and that the usual second gear braking effect may be quickly obtained whenever desired.

MANUAL OPERATION (Figs. 17 and 18)

As it is sometimes desired that a positive clutch connection be effected when the engine is not in operation, such as in towing a car to start the engine, means have been provided to meet such a contingency. Such means may consist in employing, for example, mechanism associated with the ordinary emergency, or hand parking, brake lever for effecting a positive mechanical engagement of the direct or third gear drive. For this purpose the emergency brake lever 240 (see Fig. 18) is arranged to have a forward movement beyond its normal position for disengagement of the emergency brake. As shown in Fig. 18, the emergency brake lever 240 is provided with the usual pawl 241 adapted to engage with the teeth 242 of the sector arm 243 for holding the emergency brake applied in the conventional manner. In addition to the teeth 242 the sector 243 is also provided with the teeth 244 with which is adapted to be engaged a second pawl 245 pivotally carried by the lever 240. The lower end of the lever 240 has slidably mounted thereon a block 246 which is normally in the position shown in full lines in Fig. 18. The block 246 is provided with an aperture 247 adapted, when the block is in its normal position, to stand in alignment with one end of a push rod 248, which rod extends in to the housing section 41 and at its other end engages with the lever arm 163 which, it will be recalled, is connected with the yoke 161 for moving the sliding keys 56 and second and third gear clutches into engagement. In the ordinary automatic operation of the transmission by the fluid pressure system with the block 246 in the full line normal position the movement of the lever 163 by the fluid pressure means will merely cause the outer projecting end of the rod 248 to pass freely into the aperture 247. When the emergency brake lever is used under normal conditions the block 246 will serve as a stop to limit the forward travel of said lever.

If it should ever become necessary to effect emergency operation of the automobile by manually placing direct drive or third gear in operative engagement by mechanical means, the block 246 may be raised from the full line position shown in Fig. 18 to the dotted line position shown in such figure by pulling upwardly upon the finger grip 249ª formed at the upper end of a rod 249 connected at its lower end to the block 246. When the block 246 has thus been pulled upwardly the aperture 247 will be moved out of alignment with the rod 248. If then the emergency brake lever 240 is moved forwardly to the dotted line position indicated, the block 246 will cause the rod 247 to push against the lever arm 163 moving said lever arm forwardly and thus causing the clutch for direct drive to be placed in operative driving relationship, the brake lever 240 being held in its extreme forward position by the engagement of the pawl 245 with the sector teeth 244, thereby holding the direct drive clutch and gear connection in operative condition as long as necessary or desirable.

TRANSMISSION SHAFT BRAKE (Figs. 1, 13, 15 and 16)

The driving unit here disclosed may also include as a component part thereof a transmission brake which presents some novel features of construction. This brake comprises a hollow tubular brake drum 250, suitably secured to the end of the drive shaft 52, and with the periphery of which is adapted to be engaged a pair of brake bands 251, 252.

These brake bands are in the form of semicircular halves, the ends of which are suitably secured to a U shaped bracket 253 in the sides of which are threaded four horizontal adjusting screws 257 and 258 bearing against the brake housing anchorage lug 259 as shown. There is also provided a vertical adjusting screw 260 threaded in lug 259 and projecting through bracket 253 as shown, a suitable spring 261 also being provided to normally urge the bracket 253 and brake band assembly upwardly thereby to facilitate adjustment of the brake.

The brake bands 251, 252 are provided respectively with the extensions 251ª and 252ª which are carried beyond the vertical plane in which the center of the brake drum is located, and said extensions have secured to them the cam shoes 251ᵇ and 252ᵇ respectively. Located between the cam shoes 251ᵇ and 252ᵇ is the brake shoe actuating cam 254 connected to the brake operating shaft 255, which shaft is suitably journaled in a bracket secured to the brake housing and has fastened to its outer end the brake operating lever 256 suitably connected in the usual manner to the hand brake lever 240. When such brake lever is actuated in the usual way to apply the brake, the shaft 255 and cam 254 will be rotated to cause the cam shoes 251ᵇ and 252ᵇ to be spread apart, thus exerting a pull on the extensions 251ª, 252ª of the brake bands 251, 252 and causing the latter to be tightened upon the brake drum 250.

It is possible, with the above construction, to so equalize the pressure on the two halves of the brake linings that the brake may be applied without creating sideways forces which would have to be balanced at the external supporting points of the housing. The adjusting screws 257 and 258 provide means for equalizing the clamping force applied by the two brake bands 251 and 252 and when this is accomplished, the tangential force at the upper anchorage 259 equals the tangential force adjacent to the shaft 255 which is also fixed and forms an anchorage. These two forces form a couple through which the braking force and the tendency of the drum to turn is resisted without producing any side force that would tend to deflect the shaft and its bearings. It is to be noted that this construction is a marked departure from a conventional brake unit consisting of one anchorage and a floating clamping pivot in which the braking torque is resisted by a couple consisting of the force at the anchorage and the force on the driving shaft and in which there results the exertion of an appreciable side pressure or force on the shaft and its bearings.

MODIFIED AUTOMATIC THROTTLE CONTROL

When an automobile equipped with the transmission of the present invention is being accelerated with the throttle wide open, it is desirable to have some provision for preventing the engine from speeding up when the load is removed momentarily from the engine during the shift from one speed gear to another, for example, when the shift from second to high gear occurs. It will be remembered that the automatic system is such that when the selector valve shifts from second gear to high gear position the first action will be to release the pressure of the fluid being exerted on the second gear clutch operating means, and when this pressure is released, it flows back to the sump. As the pressure is admitted to the high gear clutch operating means, part of the fluid within the pressure chamber and reservoir of the pump flows to the clutch operating means for the high gear, thus causing a momentary drop of pressure in the system. This momentary drop of pressure, coupled with the time interval necessary for the shifting of the selector valve, tends to momentarily release the engine of its load and under certain circumstances may tend to cause the engine to speed up unduly, so that when the high gear clutch is applied, there may be a tendency towards jerky clutch application. The construction diagrammatically shown in Fig. 22 is designed to meet this contingency. The parts shown in this figure correspond to the similar parts shown in Fig. 19, the reference character P indicating the pump, A the air chamber thereof, S the selector valve, PV the pressure control valve, C' the conduit connecting the pressure control valve and the selector valve and C the conduit leading from the pump to the pressure control valve, the unloading valve not being shown in this figure but it being understood that the unloading valve remains in the system. The means shown in Fig. 22 consists of a small plunger 300, slidably mounted in the chamber of the unloading valve and having a small pin that projects into the conduit C or into the pressure chamber of the pump, so as to be subjected to the pressure of the fluid in the conduit C. The plunger 300 is normally pressed outwardly into the conduit C by means of a coil spring 301, which spring encircles a small connecting rod 302, having connected to its inner end an abutment plate 303 against which the inner end of the spring bears. The other end of the spring abuts against the wall of the valve chamber.

The rod 302 projects outwardly of the valve chamber and has secured to it a laterally extending arm 304, which is connected by means of a link 305 to a lever arm 306 secured to a butterfly valve 307, which valve may be either the conventional butterfly throttle valve or an additional valve inserted in the intake to the engine.

Located between the conduit C and the outlet of the pump P is a plate 308 having a small orifice 309 through which the fluid delivered by the pump must flow in its passage to the conduit C.

The manner in which the above modification operates is as follows: The pressure exerted by the spring 301 is such that the small plunger 300 will be urged towards the left in Fig. 22 by the pressure of the fluid within the conduit C to an extent sufficient to hold the butterfly valve 307 in its fully opened position whenever the pressure within the conduit C approaches the predetermined maximum pressure of the system. When the selector valve is shifted from one position to another to change the gear ratio, and as a result the pressure is released in the lower gear clutch operating means, coupled with the simultaneous admission of pressure to the next higher gear clutch operating means, pressure within the conduit C, reservoir of the pump and air chamber will drop momentarily due to the fluid on the pressure side of the pump having to flow into the higher gear clutch operating means, as will be readily understood. When this momentary drop of pressure occurs, the plunger 300 will be moved towards the right under the action of the spring 301 and through the connections between the rod 302 and the butterfly valve, the valve 307 will be closed. The small orifice in the thin plate 309 will serve to restrict the fluid being delivered by the pump, thereby preventing the pressure within the conduit C from building up too rapidly, even though the engine may be operating at a relatively high speed. As the pressure within the conduit C builds up, due to the pump delivery, the plunger 300 will be forced towards the left thereby carrying the rod 302 in the same direction and causing the valve 307 to be opened. The momentary drop of pressure occurring as the selector valve admits fluid to the next higher gear clutch operating means is therefore employed to produce a momentary throttling of the engine and consequently tends to prevent the engine from speeding up too rapidly due to the release of the load from the engine shaft. The restriction of the output of the pump by means of the plate orifices, prevents the pressure in the conduit C from building up too rapidly and consequently a smooth, even, application of the clutch is obtained.

MODIFIED VALVE STRUCTURES

The automatic control system, as disclosed herein, has been designed for operation by relatively high fluid pressures in order that compactness of structure might be secured. When fluid pressure as high as 200 pounds per square inch is employed, however, there may be a tendency for the pressure to build up along one side of the sliding valves, if such valves are provided with the normal amount of clearance to insure their free sliding. If difficulty should be encountered in the valve sticking due to building up of pressure on one side thereof, thereby forcing or jamming the valve against the opposite wall of the valve chamber, the valve structure shown in Figs. 23, 24 and Figs. 25 and 26 may be employed.

Figs. 23 and 24 illustrate a modified construction of the selector valve, while Figs. 25 and 26 show a type of construction that may be employed for the pressure control valve.

As shown in Figs. 23 and 24, the sliding valve member 140ª of the selector valve is provided adjacent to each end with a pilot bearing section, as indicated by the reference characters 140ᵇ and 140ᶜ and the remainder of the body of the valve is turned down or reduced in size to a diameter a few thousandths of an inch less than the pilot bearing sections. The pilot bearing sections are sufficiently smaller than the valve chamber to provide for normal sliding clearance. Each pilot bearing section is provided with a drain groove 140ᵈ located between the pilot and the reduced body of the valve which communicates with the central bore 140ᵉ of the valve through a plurality of diametrically extending drain holes 140ᶠ. Due to the fact that the pilot bearing sections 140ᵇ, 140ᶜ hold the main body of the valve away from the walls of the bore of the valve chamber and with the reduced main body portion of the valve concentric to the bore of the valve chamber, there can be no building up of pressure on one side only of the valve that would tend to force the movable valve member tightly in contact with the wall of the valve chamber on one side and there can be no pressing of the pilot bearing section of the valve heavily against one side of the bore of the valve chamber because of the provision of the drainage groove 140ᵈ and diametric drain holes 140ᶠ, because as the holes 140ᶠ communicate through the central bore 140ᵉ of the valve member with the low pressure side of the system, the pilot bearing sections are relieved and are not subject to heavy oil pressure. While Figs. 23 and 24 show the pilot bearing construction of the selector valve, it will be understood that substantially the same construction can be employed also for the pressure unloading valve.

In Figs. 25 and 26 is shown a construction that may be employed for the pressure control valve in order to obviate the building up of pressure on one side of such valve. The construction shown in Figs. 23 and 24 cannot conveniently be employed for the pressure control valve due to the fact that the bore of the latter is subjected to oil under pressure and therefore drain holes similar to those employed for the selector valve cannot be used for the pressure control valve.

As shown in Figs. 25 and 26 in order to minimize the tendency of the pressure control valve to be pressed against one side of the bore of the valve chamber, the cylindrical valve member 125ᵃ is provided with pilot bearing sections at its ends 125ᵇ and each bearing section is provided with a plurality of longitudinally extending slots or grooves 125ᶜ so as to form about the periphery of the valve a plurality of longitudinally extending ribs 125ᵈ which have bearing surfaces of small area. The grooves 125ᶜ communicate with the annular spaces formed by reducing the central portion of the valve, as indicated in Fig. 25 by the reference character 125ᵉ. The provision of the grooves 125ᶜ insures that oil under pressure can not build up on one side of the valve only thereby to press the other side of the valve heavily against the side wall of the bore of the valve chamber because the pressure of the oil within the valve chamber will be communicated through the grooves 125ᶜ to all sides of the valve member 125ᵃ and 125ᵇ substantially uniformly about the periphery of the valve. It will be understood that this result may be accomplished by constructing the cylindrical valve member in any suitable manner such that it is piloted by a plurality of ribs a few thousandths of an inch high at or near each end.

CONSTRUCTIONAL AND OPERATIVE ADVANTAGES

While the transmission as herein disclosed is in effect made responsive to the extent of throttle opening in conjunction with control in accordance with vehicle speed it is to be particularly noted that the movements of the pressure control valve PV and also of the floating differential lever in consonance with throttle opening are only brought about when the accelerator pedal 34 is operated to actuate the throttle. With the present invention the usual throttle dash button control 260 is also provided and as this control is not connected directly to the fluid pressure system controls the engine may be run idle at any desired speed by manipulation of the hand throttle without making the automatic transmission operative. This permits, for example, the speeding up of the engine to warm it up in cold weather or for any other purpose without operating the transmission. It will of course be understood that any suitable well known lost motion means are provided in the connection from the throttle valve to the accelerator pedal so that the latter will not be actuated when the hand throttle button 260 is operated.

A transmission constructed in accordance with the present invention possesses many greatly advantageous features which will be briefly described in order that a better understanding of the principal inventive ideas as set forth in the appended claims may be had.

Considering first the general application as described in connection with the diagrammatic view of Fig. 19, the combination of the pressure unloading valve U, and pressure control valve PV with the selector valve S insures; first, that the fluid pressure will be maintained uniform between fairly narrow predetermined maximum and minimum limits which are sufficiently high as to insure positive engagement of the clutches for the various gear ratios without unduly increasing the clutch disc areas, thus not only may the desired compactness of the structure be obtained, but also manufacturing costs kept within commercially practicable limits. Second, the use of the pressure control valve PV enables the high fluid pressures desired for positive clutch operation to be used and at the same time smooth clutch engagement to be effected. Third, the construction and arrangement of the pressure control valve PV in combination with the selector valve permits the free wheeling function to be obtained without the employment of any separate free wheeling units, such as have been adopted in the automotive industry, with their objectionable overrunning clutches or the like that of necessity involve the addition of a relatively large number of small and comparatively fragile parts. Fourth, the entire elimination of complicated gearing or centrifugal or overrunning clutches in the transmission and fifth, the use of very simple controls for accomplishing all of the types of operations required in operation of an automobile under all normal conditions of use.

Considering next the clutch structures and their operations, it is important to note that the engagement and disengagement of the clutch discs are effected by forces applied at the outer periphery of the clutch units instead of at the center in the conventional manner. As a result, less resistance is offered to the longitudinal movement of the housing because the pressure on the sides of the splines of discs keyed at their outer periphery to the clutch housing is much less than the pressure on the sides of the splines of the shaft discs, due to the difference in the lever arms as will be readily understood.

In order to insure smoother operation of the clutches the clutch discs 68, 78 and 91 of each respective clutch that are engaged with the inner hub or driving member may be provided with slots (not shown) or otherwise made flexible so as to permit clutch engagement without any sliding movement upon their respective splines.

The longitudinal movement of the clutch housing also permits the installation in a single housing of both the clutches for second and third gear drives thus enabling a single clutch actuating mechanism to be employed and also materially restricting the size of the clutch mechanism as well as simplifying the structure and thus reducing the manufacturing costs.

The means by which the thrust to effect the longitudinal movement of the clutch housing is transmitted to said housing also presents marked advantages. This means it will be recalled is the ball bearing 55, carried by the sliding keys 56 and clamped between said keys and the gear 90 at the end of the sleeve 77. The keys 56 being stationary, the ends of the yoke arm 161 which engage said keys are not in engagement with a continuously rotating member with consequent friction loss and necessary frequent lubrication as in the conventional clutch shifting mechanism.

Coming now to a consideration of the inventive features of the gearing per se, the use of but a single countershaft 84 carrying both the gears for first and second drive and the use of the gears 87, 88 to transmit the drive from the countershaft to the driving shaft 52 for both first and second drive present marked advantages both from the standpoints of compactness and simplicity, hence low cost of construction and also efficiency of operation due to the reduction of the number of moving parts. The countershaft sleeve 83 which carries the gears for second speed and is secured to rotate in unison with the first gear clutch housing 93 enables the latter to be employed for not only enclosing but driving the speed governor at vehicle speed due to the fact that for forward drive at any speed gear ratio the housing 93 will always be rotated in accordance with the rotation of the driving shaft 52 due to the connection of the gears 87, 88.

As hereinbefore pointed out the pump 105 being connected to the countershaft 84 will always be driven at engine speed due to the connection by the gears 90, 90ª to the engine through the clutch housing 49, hence not only will fluid under pressure always be available when the engine is operating, but this construction enables the same gears 90, 90ª used for transmitting first drive to be employed for driving the pump. The use of the pump as the cylinder and piston for the application of the first gear clutch and the transmission of the thrust for such application through the countershaft 84, results in the elimination of a large number of parts that would otherwise be necessary were not the above parts employed to perform multiple functions. Further elimination of extra parts, and consequently simplification and reduced manufacturing cost, as well as compactness, are secured by the reverse gear mechanism disclosed in which the same gear 88 as used to transmit the drive for both first and second gear is also used for reverse. It is also to be noted that possibilities for gear noise are reduced by providing means for keeping the reverse idler gear normally out of mesh.

Another important inventive feature lies in the conical support provided for overhung bearing 80 of shaft 52. This consists of housing 49 forming a wide base and tapering to sleeve 54 within which sleeves 77 and 74 are rotatably mounted, with bearing 80 secured in the outer end.

Other important and advantageous inventive features have been hereinbefore brought out in the detailed description or will readily occur to those skilled in the arts to which the invention relates.

While I have disclosed a satisfactory constructional example of a transmission constructed in accordance with the principles of my invention, it will be understood that such disclosure is merely illustrative of such principles and that many variations, changes and modifications of the constructional details of the illustrative example herein disclosed may be resorted to without departing from such principles. For example, while the invention has been described in connection with automatic means for rendering the various gear ratios effective for driving an automobile, it will be understood that many of the features of construction of the transmission would be equally operative and effective for an automobile without employing the automatic controls, or that many of the principles of the invention could be employed for a power transmission device not intended for automobile use and either with or without the automatic operation. Likewise many of the principles of the automatic operation could be used with considerable modification of the transmission gearing as disclosed.

I claim:

1. An automatic change speed gear transmission particularly adapted for automotive vehicles, comprising driving and driven shafts, a plurality of gear trains for establishing different gear ratios between said shafts, a longitudinally movable clutch housing, a pair of clutches within said housing, means for normally holding said housing in a neutral position, means connecting the clutches within said housing with said gear trains of different ratio and means for shifting said clutch housing in either direction from its neutral position to cause one or another of said gear trains of different gear ratios to be made operative, said means comprising means responsive to variations in throttle opening and the speed of the automobile to actuate said housing in either one or another direction and thereby place that gear ratio best suited for driving conditions in operative relationship.

2. In a change speed power transmission for automobiles including means for effecting a plurality of forward speeds and a reverse drive, a prime mover, a driving shaft and means for transmitting power from said prime mover to said driving shaft comprising a countershaft, a sleeve rotatably carried by said countershaft, a pair of continuously intermeshing gears connecting said sleeve and driving shaft for forward driving, a pair of continuously meshed gear trains of different gear ratios, one connecting said prime mover and sleeve and the other said prime mover and countershaft and means for rendering either of said gear trains effective to transmit power to said driving shaft through said sleeve and said pair of continuously intermeshing gears.

3. In a change speed power transmission a prime mover, a driving shaft and means for transmitting power from said prime mover to said driving shaft comprising a countershaft, a sleeve rotatably carried by said countershaft, a pair of continuously intermeshing gears connecting said sleeve and driving shaft, a gear train continuously connecting said countershaft and prime mover, and clutch means between said countershaft and sleeve for causing power to be transmitted through said countershaft and sleeve to said driving shaft, and means for shifting said countershaft longitudinally to render said clutch means operative.

4. A change speed gear for automobiles including means for effecting a plurality of forward speeds and a reverse drive, comprising a driving shaft and means connecting it with the automobile engine including a countershaft, a sleeve rotatably mounted on said countershaft, a pair of gears in continuous meshing engagement between said sleeve and driving shaft for forward driving, continuously meshed gear trains for first and second speed drive, one of said gear trains being interposed between said engine and countershaft and the other between said engine and sleeve, means for rendering either of said gear trains effective and means for connecting said engine and driving shaft in direct driving relationship.

5. A change speed gear for automobiles, comprising a driving shaft and means connecting it with the automobile engine including a countershaft, a sleeve rotatably mounted on said countershaft, a pair of gears in continuous meshing engagement between said sleeve and driving shaft for forward driving, gear trains for first and second speed drive, one of said gear trains being interposed between said engine and countershaft and the other between said engine and sleeve, means for rendering either of said gear trains effective and means for connecting the engine to said driving shaft for reverse drive including said sleeve and one of the members of said pair of gears.

6. A change speed gear for automobiles, comprising a driving shaft and means connecting it with the automobile engine including a countershaft, a sleeve rotatably mounted on said countershaft, a pair of gears in continuous meshing engagement between said sleeve and driving shaft for forward driving, gear trains for first and second speed drive, one of said gear trains being interposed between said engine and countershaft and the other between said engine and sleeve, means for rendering either of said gear trains effective, and means for connecting the engine to said driving shaft for reverse drive including an idler gear, a reverse driving gear on said sleeve and means for shifting one of the members of said pair of gears out of mesh with the co-operating member of said pair and subsequently shifting said idler gear into mesh with said reverse driving gear and said one member of said pair of gears.

7. A transmission for automobiles, a driving shaft and means for connecting it in driving relationship with the automobile engine comprising a countershaft and a sleeve rotatably mounted on said countershaft, said sleeve being provided with a plurality of gears, a sleeve on said driving shaft and a gear on said countershaft in co-operating continuously meshing engagement for first speed drive, a second sleeve on said driving shaft having a gear in meshing engagement with one of the gears on said countershaft sleeve for effecting second speed drive, and a gear on said driving shaft connecting with a third gear on said sleeve and transmitting the drive to said drive shaft for both first and second speed drives.

8. In an automatic change speed transmission for automobiles, a driving shaft, a plurality of gear trains of different speed ratio for effecting first and second gear drives interposed between said driving shaft and the automobile engine, an automatic control system including a fluid pressure pump and a plurality of fluid pressure actuated clutches, a shaft carrying certain of the gears of said gear trains, and said shaft having an extension for driving said pump whereby said gear train gears form the complete gear connection for driving said shaft and said pump driving shaft extension.

9. In an automatic change speed transmission for automobiles, a driving shaft, a plurality of gear trains of different speed ratio for effecting first and second gear drives interposed between said driving shaft and the automobile engine, an automatic control system including a fluid pressure pump, a centrifugal governor and a plurality of fluid pressure actuated clutches, certain of the gears for transmitting the drive to said driving shaft being continuously connected during forward drive between said driving shaft and governor.

10. An automatic transmission for automobiles, comprising a plurality of gear trains of different speed ratios interposed between the engine and the driving shaft of the automobile, an automatic control system including a fluid pressure pump, clutches operated by the fluid under pressure from said pump for rendering any of the different speed ratios effective, and a centrifugal governor continuously connected in driving relationship with said driving shaft, certain of the gears comprising said gear trains being in continuous intermeshing relationship and in driving connection between said pump and engine.

11. In an automatic transmission for automobiles of the type wherein fluid pressure operated clutches are caused to be automatically engaged to make the different speed gear ratios effective for forward driving, means for manually actuating one of said clutches independently of pressure actuation thereof, said means comprising the conventional emergency or parking brake lever of an automobile, means secured to said lever normally in position to permit the fluid pressure actuation of said clutches, a manually operable device connected with said last named means for moving it out of said normal position and connections between the clutch operating mechanism and said device for rendering the same effective to throw one of said clutches into engagement by movement of said brake lever.

12. A change speed automobile transmission of the type wherein a plurality of continually meshed, change speed, gears of different gear ratios are provided for forward driving and an idler gear for effecting reverse driving, characterized by the provision of a main driving shaft, a countershaft and a pair of gears connecting said countershaft and main driving shaft in continuously meshed engagement for forward driving, one of the members of said gears being slidable out of meshed engagement with the other member of said gears, a reverse idler gear adjacent to said slidable gear and engageable thereby when said slidable gear is moved out of meshing engagement with its co-operating gear member, said idler being maintained stationary except when engaged by said sliding gear.

13. A change speed automobile transmission, as defined in claim 12, in which the countershaft is provided with a reverse driving gear and means are provided for sliding the sliding gear and reverse idler gear successively to engage the reverse idler gear with the countershaft driving gear and then with said sliding gear.

14. A change speed automobile transmission, as defined in claim 12, in which the countershaft is provided with a reverse driving gear and means are provided for sliding the sliding gear and reverse idler gear successively to engage the reverse idler gear with the countershaft driving gear and then with said sliding gear, said means including a plurality of articulated levers and manually operated means for actuating said levers, said levers having a lost motion connection between said sliding gear and the manually operated means whereby said sliding gear will not be actuated until said reverse idler gear is engaged with said countershaft driving gear.

15. In a fluid pressure actuated change speed transmission, a plurality of change speed gear trains of different gear ratio, fluid pressure actuated clutches for selectively making said different gear ratios effective, and a fluid pressure pump, said pump including a pair of members having relative movement in one direction for performing the pumping function and relative movement in another direction to act as a fluid pressure cylinder and piston, connections from said pump to one of said fluid pressure actuated clutches and means for admitting fluid under pressure to one end of the cylinder and piston provided by said pump structure to produce relative movement between said pump members to actuate said clutch.

16. An automatic fluid pressure controlled change speed transmission for an automobile having a throttle controlled engine and a manually operated device for actuating said throttle characterized by a plurality of fluid pressure operated clutches for selectively making different gear ratios effective, a pump for supplying fluid under pressure to said clutches, a pressure control valve for governing the pressure of the fluid delivered by said pump to said clutches, said pressure control valve having a member of small cross sectional area subjected to the pressure of the fluid flowing from said pump to said clutches and a connection between said member and said throttle for actuating said pressure control valve, the small cross sectional area of said member reducing to a minimum the resistance to movement of said throttle actuating member by the pressure of the fluid in the fluid pressure system.

17. In an automatic change speed transmission for an automobile, having a throttle controlled engine and means for actuating said throttle, a plurality of gear trains of different gear ratio, fluid pressure actuated clutches for rendering said different gear ratios effective, a pump for delivering fluid under pressure to said clutches, a selector valve for selectively controlling the flow of fluid to said clutches and means for actuating said selector valve including a connection to said throttle actuating member and a governor driven in accordance with the speed of the automobile, said selector valve including means for normally holding it fully opened in any of its operative positions, and said connections to said selector valve including means for insuring positive action of the said selector valve from one of its fully opened positions to the next fully opened operative position thereof.

18. In an automatic change speed transmission for an automobile having a throttle controlled engine and means for actuating said throttle, said transmission comprising a plurality of gear trains of different gear ratios, a main control device, a speed governor driven directly in accordance with the speed of the automobile, connections from the throttle actuating means and the said speed governor to said main control device for actuating said main control device in accordance with the extent of throttle opening and vehicle speed, a secondary control device and connections thereto from said throttle actuating means for normally effecting a neutral condition of said transmission when said throttle actuating means is released to permit the closing of the throttle, thereby to establish a free wheeling condition, manually operable means for selectively rendering free wheeling effective or non effective, and connections between said speed governor and said secondary control device for automatically producing a neutral condition of the transmission at low vehicle speeds, irrespective of the setting of said manually operable means.

19. The combination with an engine driven vehicle of an automatic transmission of the type wherein fluid pressure operated clutch means is caused to be automatically engaged to make the different speed gear ratios effective for forward driving, fluid pressure operated means for automatically actuating said clutch means in accordance with the combined variation in the output of said engine and the speed of said vehicle, a fluid pressure pump directly operated by said engine for rendering said automatic fluid pressure means operable, and manually operated means for effecting engagement of said clutch means independent of said engine operated fluid pressure pump.

20. An automatic transmission for automobiles of the type where in different speed gear ratios are made effective under the control of a centrifugal governor characterized by the said governor consisting of weights carried and movable under the influence of said centrifugal force radially of the axis of rotation, a part to be operated by said weights mounted for movement substantially on the axis of rotation of said weights, pivoted arms connecting said weights to said part to be operated, and progressive spring means resisting outward movement of said weights.

21. An automatic transmission for automobiles comprising a plurality of gear trains of different speed ratios interposed between the engine and the driving shaft of the automobile, an automatic control system including a fluid pressure pump and a governor, clutches operated by the fluid under pressure from said pump for rendering any of the different speed ratios effective as controlled by said governor, certain of the gears comprising said gear trains being in continuous intermeshing relationship and in driving connection between said pump and engine, and other of the gears comprising said gear trains being also in continuous intermeshing relationship but in driving connection between said governor and said automobile driving shaft.

22. The combination with a fluid pressure system for operating a change speed transmission, of a pump, a by-pass conduit, a valve the actuation of which connects said pump selectively with said system or with said by-pass, a control element responsive to pressure in said system for actuating said valve to maintain said pump in connection with said system while the pressure therein is below a predetermined amount and to close the connection from said pump to said system and to connect said pump with said by-pass when the pressure in said system exceeds a predetermined maximum.

23. In an automotive transmission mechanism, friction clutch means for rendering said transmission operable, a source of fluid pressure, an actuating unit expansible by fluid pressure for operating said clutch means, a connecting conduit between said source of fluid pressure and said actuating unit, and means to control the building up of pressure in said actuating unit comprising a thin plate orifice in said connecting conduit for effecting substantially uniform flow conditions regardless of variations in viscosity of said fluid.

24. The combination with an automotive vehicle having an engine for propelling the same and a control member for governing the speed of said engine, of an automatic fluid pressure operated change speed transmission comprising gear trains of different speed ratios and a plurality of clutch mechanisms for making said speed ratios effective, means expansible by fluid pressure for operating each of said clutches, a source of fluid pressure, a connecting conduit between said source and each of said means, a control valve for selectively admitting fluid under pressure to said means, an element responsive to change in said fluid pressure in said connecting conduit and means connecting said pressure responsive element and said engine control member for automatically actuating the latter to decrease the speed of said engine momentarily during the interval between disengagement of one of said clutches and engagement of another to vary said speed ratio.

25. The combination with a change speed transmission installed to vary the gear ratio between the engine and the wheel propelling shaft of an automobile, of a control member for governing the speed of said engine, means expansible by fluid pressure for selectively operating said transmission through various gear ratios, a source of fluid pressure, an element responsive to change in said fluid pressure, and means connecting said pressure responsive element and said engine control member for automatically actuating the latter to decrease the speed of said engine during the interval when pressure in said conduit is reduced by admission of fluid to said expansible means to operate said transmission.

26. The combination with an automotive vehicle having an engine for propelling its driving wheels, an engine throttle and a control member, of a transmission providing for change in gear ratio between said engine and the driving wheels of said vehicle, a clutch for rendering said transmission operable, an element connected with said engine throttle control member, and means associated with said element for automatically governing the extent of throttle opening in accordance with the extent of pressure applied to engage said clutch.

27. An automatic transmission for automobiles comprising a plurality of gear trains of different speed ratios interposed between the engine and the driving shaft of the automobile, an automatic control system including a fluid pressure pump in driving relationship with said engine, clutches operated by the fluid under pressure from said pump for rendering any of the different speed ratios effective, and a centrifugal governor, certain of the gears comprising said gear trains being in continuous intermeshing relationship and in driving connection between said governor and said driving shaft.

WILLIAM T. LIVERMORE.